(12) United States Patent
Kataoka et al.

(10) Patent No.: US 9,328,899 B2
(45) Date of Patent: May 3, 2016

(54) LED LIGHTING APPARATUS EMITTING CONTROLLED SPATIAL ILLUMINATION LIGHT

(76) Inventors: Shoei Kataoka, Tokyo (JP); Teruyuki Kataoka, Tokyo (JP)

( * ) Notice: Subject to any disclaimer, the term of this patent is extended or adjusted under 35 U.S.C. 154(b) by 265 days.

(21) Appl. No.: 13/395,355

(22) PCT Filed: Mar. 16, 2010

(86) PCT No.: PCT/JP2010/054373
§ 371 (c)(1),
(2), (4) Date: Mar. 9, 2012

(87) PCT Pub. No.: WO2011/030578
PCT Pub. Date: Mar. 17, 2011

(65) Prior Publication Data
US 2012/0169953 A1 Jul. 5, 2012

(30) Foreign Application Priority Data
Sep. 11, 2009 (JP) .................. 2009-233852

(51) Int. Cl.
| G02F 1/13 | (2006.01) |
| F21V 14/00 | (2006.01) |
| F21K 99/00 | (2016.01) |
| F21S 8/04 | (2006.01) |
| G02F 1/1335 | (2006.01) |
| G02F 1/1333 | (2006.01) |

(Continued)

(52) U.S. Cl.
CPC ............... *F21V 14/003* (2013.01); *F21K 9/135* (2013.01); *F21S 8/04* (2013.01); *G02F 1/1334* (2013.01); *G02F 1/133371* (2013.01); *G02F 1/133526* (2013.01); *G02F 1/133603* (2013.01); *H05B 37/0245* (2013.01); *F21V 3/00* (2013.01); *F21W 2131/40* (2013.01); *F21Y 2101/02* (2013.01); *F21Y 2111/005* (2013.01)

(58) Field of Classification Search
CPC .................................................. G02F 1/133526
USPC ...................................... 345/102; 349/33, 39
See application file for complete search history.

(56) References Cited

U.S. PATENT DOCUMENTS

| 5,764,316 A | 6/1998 | Takizawa et al. |
| 6,859,333 B1 * | 2/2005 | Ren et al. ...................... 359/721 |

(Continued)

FOREIGN PATENT DOCUMENTS

| CN | 1991469 | 7/2007 |
| CN | 101004516 | 7/2007 |

(Continued)

OTHER PUBLICATIONS

Richard Stevenson, "The LED's dark secret," IEEE Spectrum, Aug. 9, 2009, pp. 22-27.

(Continued)

*Primary Examiner* — Temesgh Ghebretinsae
*Assistant Examiner* — Lisa Landis
(74) *Attorney, Agent, or Firm* — Hamre, Schumann, Mueller & Larson, P.C.

(57) ABSTRACT

Light from an LED (light-emitting diodes) has strong directional characteristics; therefore, lighting over large area, as well as control of the quality or the distribution of lighting was impossible. Placing a liquid-crystal panel in front of an LED (light-emitting diodes) enables to control light from the LED and the quality or the distribution of lighting.

20 Claims, 31 Drawing Sheets

(51) Int. Cl.
*G02F 1/1334* (2006.01)
*H05B 37/02* (2006.01)
*F21V 3/00* (2015.01)
*F21W 131/40* (2006.01)
*F21Y 101/02* (2006.01)
*F21Y 111/00* (2016.01)

(56) References Cited

U.S. PATENT DOCUMENTS

| | | | |
|---|---|---|---|
| 2004/0145905 A1 | 7/2004 | Strazzanti | |
| 2004/0169630 A1* | 9/2004 | Ide | 345/96 |
| 2005/0041010 A1* | 2/2005 | Komoto et al. | 345/102 |
| 2007/0171353 A1 | 7/2007 | Hong | |
| 2007/0182699 A1* | 8/2007 | Ha et al. | 345/102 |
| 2007/0200989 A1 | 8/2007 | Shinichi et al. | |
| 2007/0247560 A1* | 10/2007 | Shin et al. | 349/46 |
| 2007/0273265 A1* | 11/2007 | Hikmet | 313/483 |
| 2009/0262063 A1* | 10/2009 | Fujine et al. | 345/102 |
| 2010/0302499 A1* | 12/2010 | Watanabe | 349/201 |

FOREIGN PATENT DOCUMENTS

| | | |
|---|---|---|
| JP | 5-210077 | 8/1993 |
| JP | 5-333324 | 12/1993 |
| JP | 11-353907 | 12/1999 |
| JP | 2004-264549 | 9/2004 |
| JP | 3913184 | 2/2007 |
| JP | 2008-028275 | 2/2008 |
| JP | 2009-500232 | 1/2009 |
| JP | 2009-168962 | 7/2009 |
| JP | 2009-192558 * | 8/2009 |
| WO | 2007/007235 | 1/2007 |

OTHER PUBLICATIONS

Kanji Bando, "Development of LED lighting (1)", Journal of the Illuminating Engineering Institute of Japan, vol. 92, No. 6, 2008, pp. 301-306 (English language abstract and explanation of relevance provided).

Special Feature Article "LED," Nihon Keizei Shinbun, Aug. 30, 2009, p. 6 (English language explanation of relevance provided).

Jun Okazaki et al., "Present and Future of LEDs for illuminations," Sharp Corporation Technical Report, vol. 99, Aug. 2009, pp. 10-16 (English language explanation of relevance provided).

Shoji Yokota, "LED Device for Illuminations," Sharp Corporation Technical Report, vol. 99, Aug. 2009, pp. 17-19 (English language explanation of relevance provided).

Shoichi Matsumoto et al., "Liquid Crystals—Fundamental and Applications," Kogyo Chosakai Publishing Inc., pp. 341-342, 1996 (English language explanation of relevance provided).

* cited by examiner

LED LIGHTING APPARATUS EMITTING CONTROLLED SPATIAL ILLUMINATION LIGHT

TECHNICAL FIELD

The present invention relates to a lighting apparatus using LEDs that can control the quality and the area of lighting by combining LEDs with a liquid-crystal panel.

BACKGROUND ART

An LED, which emits light by applying a direct voltage to a p-n junction in a compound semiconductor, has been used for home lighting as a result of the recent remarkable progress of technologies. Multi-layered p-n junctions, as well as LEDs (light-emitting diode) mounted on a board have been made it possible to use for high power lighting. An LED lighting, however, because of the structure of its light emitting part, has strong directional characteristics; therefore the use of the LED lighting was limited to downlights. Unlike conventional incandescent bulbs or florescent lamps, an LED lighting was not able to illuminate large areas of a room. It was also not able to control the quality or the area of lighting.

PRIOR ART DOCUMENTS

Patent Documents

Patent Document 1: JP-A-2008-28275
Patent Document 2: JP-T-2009-500232
Patent Document 3: JP-A-HEI11-353907
Patent Document 4: JP-A-HEI05-210077
Patent Document 5: JP 3913184
Patent Document 6: JP-A-2004-264549
Patent Document 7: U.S. Pat. No. 6,859,333

Non-Patent Documents

Non-Patent Document 1: Richard Stevenson, "The LED's dark secret", IEEE Spectrum, 08.09, 2009, pp. 22-27
Non-Patent Document 2: Kanji Bando, "Development of LED lighting (1)", Journal of the Illuminating Engineering Institute of Japan, VOL 92, No. 6, 2008, pp. 301-306
Non-Patent Document 3: Special Feature Article "LED", Nihon Keizei Shinbun, 08.30.2009, p. 6
Non-Patent Document 4: Jun Okazaki, Masaaki Kato, and Katsuyuki Konishi, "Present and Future of LEDs for illuminations", Sharp Corporation Technical Report, VOL99, 8, 2009, pp. 10-16
Non-Patent Document 5: Shoji Yokota, "LED Device for Illuminations", Sharp Corporation Technical Report, VOL99, 8, 2009, pp. 17-19
Non-Patent Document 6: Shoichi Matsumoto and Kazuyoshi Tsunoda, "Liquid Crystals—Fundamental and Applications", Kogyo Chosakai Publishing Inc., pp 341-342

SUMMARY OF INVENTION

Problems to Be Solved by the Invention

Conventional incandescent bulbs or florescent lamps can illuminate over a large area because of the line-emitting or surface-emitting structure. On the other hand, an LED (light-emitting diode), an extremely small chip, is a point light source. The light can be scattered by positioning reflective plates in the behind or in the surroundings of itself, or by coating inside a glass container with a diffusion paint. However, it was not able to illuminate large areas of a room. It was not possible for LEDs to change the brightness partially as required.

Means to Solve the Problems

In order to solve these problems, the present invention is a lighting apparatus placing a liquid-crystal panel in front of LEDs (light-emitting diodes). The directions of long and thin liquid crystal molecules are varied by an applied electric field and its characteristics to light are changed. Therefore, liquid crystals are widely used for displays.

A liquid-crystal panel is made by inserting liquid crystals between two opposite electrode plates. In a typical liquid crystal material, when no voltage is applied between the electrode plates, liquid crystal molecules become parallel to the electrode plates as a result of the boundary condition. When a voltage is applied, the liquid crystal molecules become parallel to the electric field, namely, become vertical to the plates. Therefore, when no voltage is applied, light vertical to the liquid-crystal panel is reflected, whereas when a voltage is applied, the light is passed through. In addition, the optical refractive index of the liquid crystal is changed by the applied voltage.

FIG. 1A shows the basic structure of a lighting apparatus of the present invention. The lighting apparatus includes: an LED substrate 1; LEDs (light-emitting diodes) 2; light emitted from the LEDs (light-emitting diodes) 3; a liquid-crystal panel 4; and light 5 from the liquid-crystal panel 4. Typically, light from the liquid-crystal panel is scattered or dispersed if the structure or the constituent of the liquid-crystal panel 4 is not uniform.

Effects of Invention

With the LED lighting apparatus of the present invention, the distribution of illumination light from LEDs can be controlled, thereby unprecedented lighting such as concentrating, dispersing, and/or scattering light for desired areas, or illuminating with indirect lighting for an entire room is possible, improving lighting quality significantly. In addition, the conventional two lighting apparatuses will be replaced by one lighting apparatus of the present invention, and thus this invention contributes a lot to the energy-saving and environment problems.

BRIEF DESCRIPTION OF DRAWINGS

FIG. 10A is a plan view of an example of a liquid-crystal panel used in the present invention.

DESCRIPTION OF EMBODIMENTS

Figure 1A:
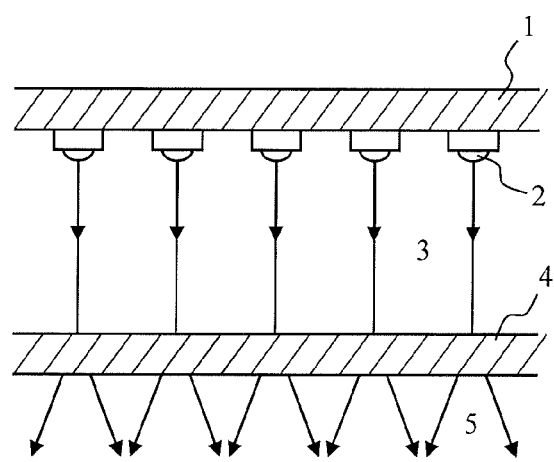
FIG. 1A is a sectional view of a basic structure of a lighting apparatus of the present invention.
Figure 1B:
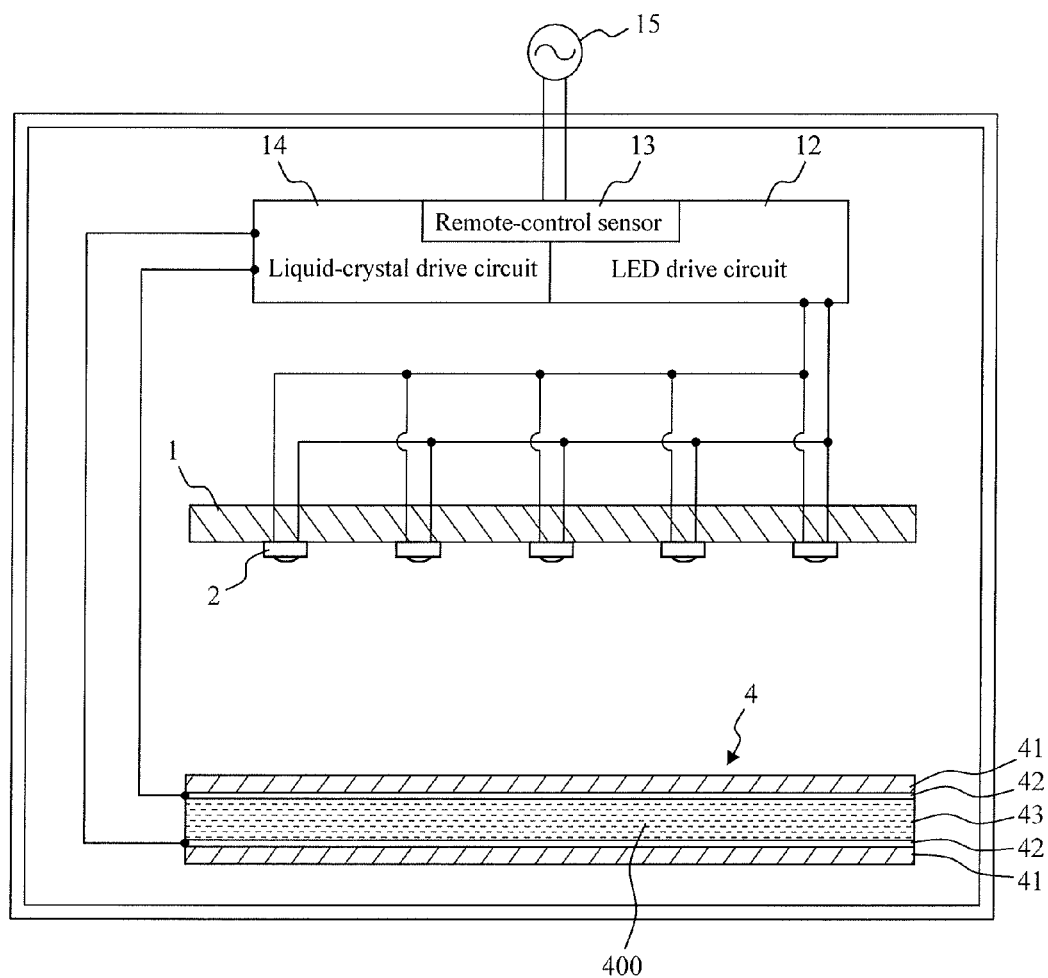
FIG. 1B is a sectional view showing the detail of a basic structure of a lighting apparatus of the present invention.

With reference to FIG. 1B, the structure of an LED lighting apparatus of the present invention is described in detail. The lighting apparatus in accordance with an embodiment of the present invention includes: LEDs (light-emitting diodes) 2 which is mounted on a substrate 1, a liquid crystal panel 4, an LED drive circuit 12, a remote control sensor (remote-control signal receiver) 13, and a liquid-crystal drive circuit 14. The LED drive circuit 12, the remote-control sensor 13, and the liquid-crystal drive circuit 14 are connected to a commercial power supply 15 for domestic use. That is, the LED drive circuit and the liquid-crystal drive circuit are provided with voltages from a common commercial power supply. Transparent electrodes 42 are connected to the liquid-crystal drive circuit 14. The LEDs (light-emitting diodes) 2 are connected to the LED drive circuit 12. Embedding a human detection sensor in the lighting apparatus in accordance with an embodiment of the present invention enables to detect automatically areas where human is present and thus to provide comfortable and energy-saving lighting.

The liquid-crystal panel 4 is composed by sealing a liquid crystal material 43 between two parallel glass substrates 41 where individual electrodes 42 consisting of transparent electrical-conductive films such as ITO are provided. When several volts are applied to the electrodes 42, the direction of liquid crystal molecules 400 is changed to vary the optical characteristics. Herein the optical characteristics include the transmittance rate, refraction rate and attenuation rate of light.

According to an embodiment of the present invention, the liquid-crystal drive circuit can change the modes of optical characteristics of the liquid-crystal panel as desired. For example, light transmittance and light refraction can be varied in a desired value.

The detail will be described later. Thereby illumination light from the lighting apparatus can be varied in a desired mode. Moreover, as described in detail below, according to the present invention, the form and structure of the electrodes of a liquid-crystal panel can be made in various modes. It also enables light from the lighting apparatus to vary in a desired mode.

The LED (light-emitting diode) 2 with a single p-n junction will be operated at several volts. Since both an LED (light-emitting diode) and a liquid-crystal panel are basically operated at several volts, thus the coherence between the electric circuits for them is considerably high. Therefore, both of the electric circuits can be integrated.

Even when a plurality of LEDs (light-emitting diode) are connected in serial and/or in parallel for high output, the drive voltage will be approximately 10 to 15 volts. Also, some liquid-crystal panels operate at approximately 10 to 15 volts. Thus, coherence between LEDs and liquid-crystal panels is considerably high as electric components.

Figure 1C:
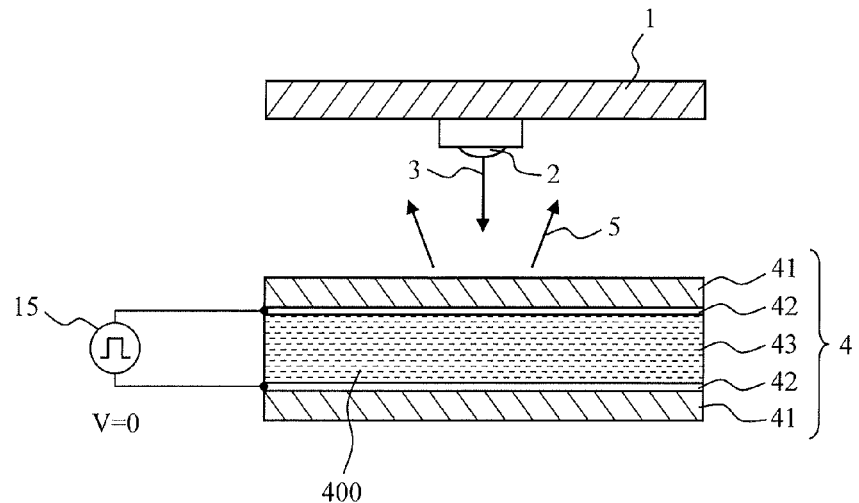
FIG. 1C shows a direction of liquid crystal molecules when no voltage is applied to a liquid-crystal panel of a lighting apparatus of the present invention.
Figure 1D:
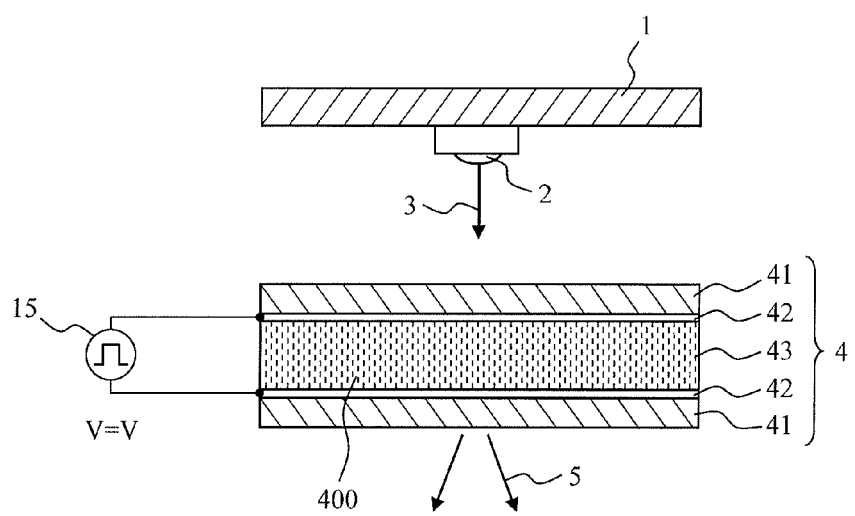
FIG. 1D shows a direction of liquid crystal molecules when a voltage is applied to a liquid-crystal panel of a lighting apparatus of the present invention.

With reference to FIGS. 1C and 1D, the present invention is described. For a liquid-crystal panel to be used for an embodiment of this invention, nematic liquid crystals are used, and the distance between the electrodes of the panel is 4 microns. As shown in FIG. 1C, when zero volt is applied to a liquid-crystal panel to be used in an embodiment of this invention, the direction of liquid crystal molecules 400 is almost parallel to the electrode surface, resulting in not passing incident light 3 much. As shown in FIG. 1D, increase in supply voltage changes the direction of the liquid-crystal molecules 400, and the direction of molecules becomes able to pass the light 3 and becomes almost transparent at 5 voltages. Such characteristics, however, may greatly vary depending on the treatment of a liquid-crystal substrate and on the liquid-crystal materials.

At present an application of liquid crystals in wide use is a display, which can regulate the optical transmission of fine pixels from complete zero to 100 percent. In this present invention, only optical transmission, reflection, and scattering in some range for a wide area are required, thus the structure of a liquid-crystal panel is considerably simple for easy production at a low cost.

Figure 2A:
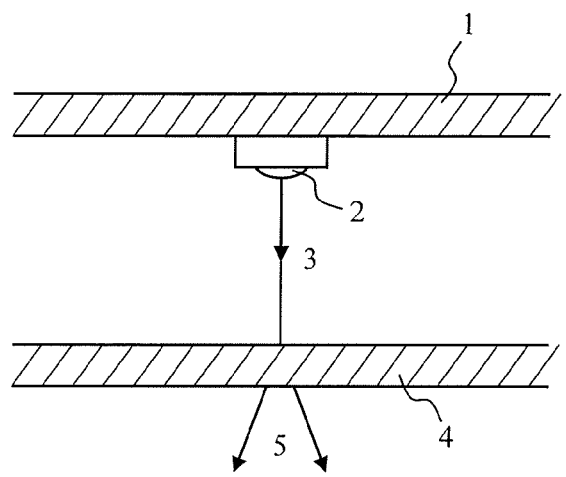
FIG. 2A is a sectional view of a lighting apparatus of the present invention in which a liquid-crystal panel having functions of a concave lens is placed.

FIG. 2A shows an embodiment of the present invention, in which a liquid-crystal panel acts as a concave lens by making micro-lenses or Fresnel structures in the electrodes of a liquid-crystal panel. In this embodiment, the liquid-crystal panel 4 that acts as a lens is positioned in parallel to the LED substrate 1 and thus light of high directionality 3 from an LED (light-emitting diode) 2 is scattered to generate light such as 5, in a wide area. A liquid-crystal panel that acts as a convex lens with the perforated structure or the Fresnel structure of the electrodes can converge the light emitted from an LED (light-emitting diode) to provide a lighting apparatus that concentrates bright light in local.

Figure 2B:
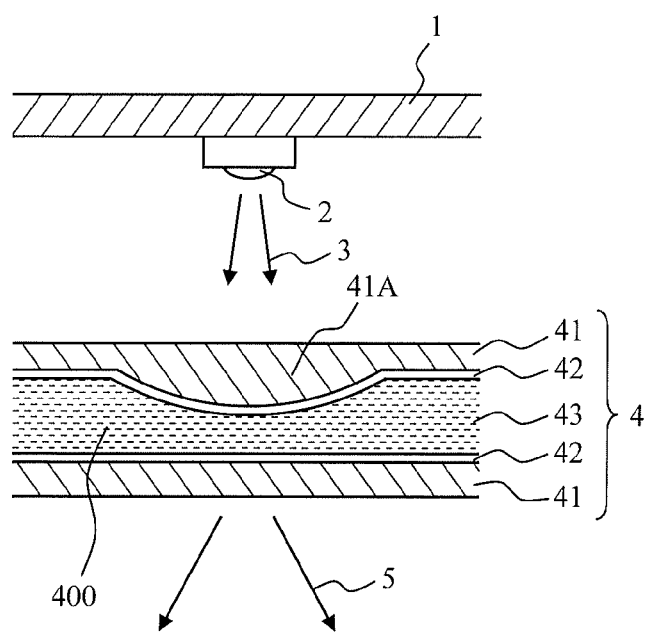
FIG. 2B is a sectional views showing the detail of a structure of a lighting apparatus of the present invention in which a liquid-crystal panel has microlenses having functions of a concave lens.
Figure 2C:
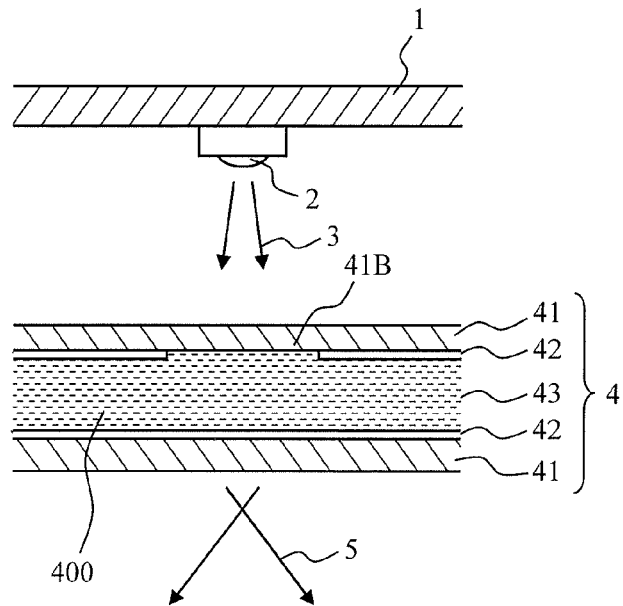
FIG. 2C is a sectional view showing the detail of a structure of a lighting apparatus of the present invention in which a liquid-crystal panel having an area of no electrode.
Figure 2D:
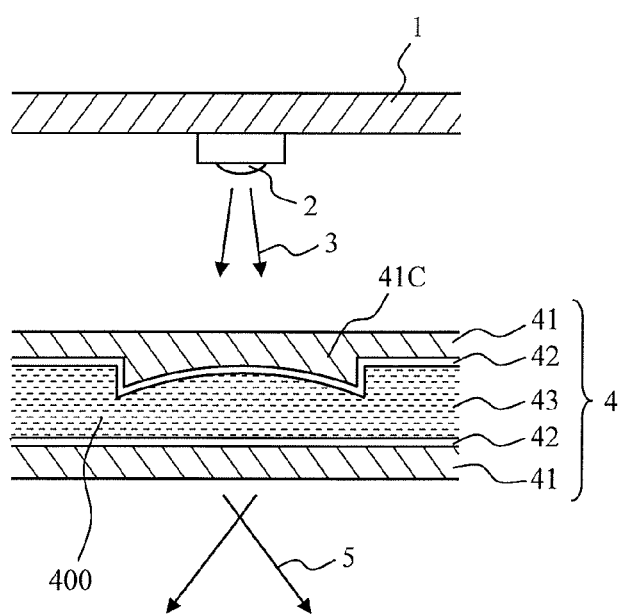
FIG. 2D is a sectional view showing the detail of a structure of a lighting apparatus of the present invention in which a liquid-crystal panel has microlenses with functions of a convex lens.
Figure 2E:
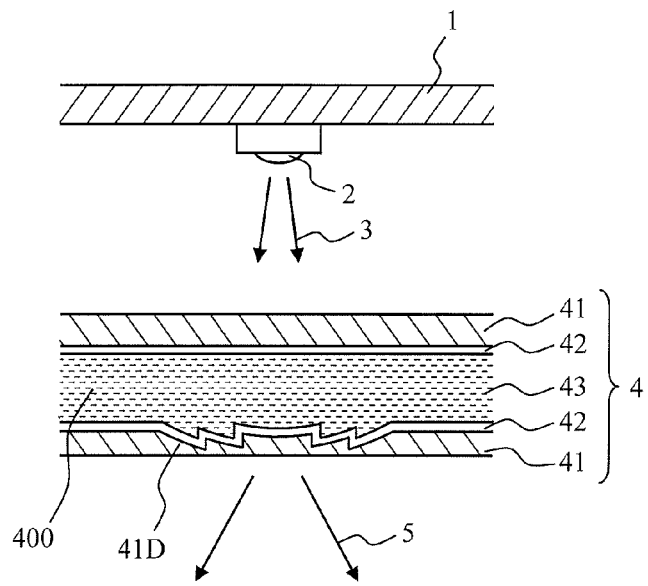
FIG. 2E is a sectional view showing the detail of a structure of a lighting apparatus of the present invention in which a liquid-crystal panel has a Fresnel structure of functions of a convex lens.

In the embodiment of the present invention shown in FIG. 2B, a lens structure 41A where liquid crystal panel acts as a concave lens is formed on a glass substrate 41. In this embodiment of the present invention shown in FIG. 2C, a region 41B without electrode is formed on a glass substrate 41. In the embodiment of the present invention shown in FIG. 2D, a micro lens structure 41C where liquid-crystal panel acts as a convex lens is formed on a glass substrate 41. In the embodiment of the present invention shown in FIG. 2E, a Fresnel lens 41D is formed on a glass substrate 41.

Figure 2F:
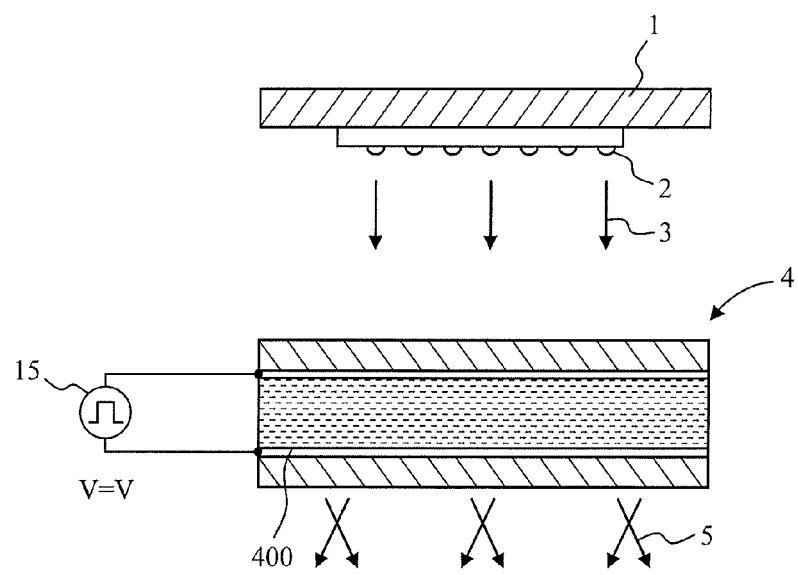
FIG. 2F is a sectional view showing the detail of a structure of a lighting apparatus of the present invention in which a liquid-crystal panel has microlenses of various functions.

In the embodiment of the present invention shown in FIG. 2F, a plurality of micro-lenses or Fresnel lenses are formed on a glass substrate 41. As for these lens structure, a relatively large lens structure underneath LEDs or very small micro-lens array can be made according to the requirement.

Figure 3A:
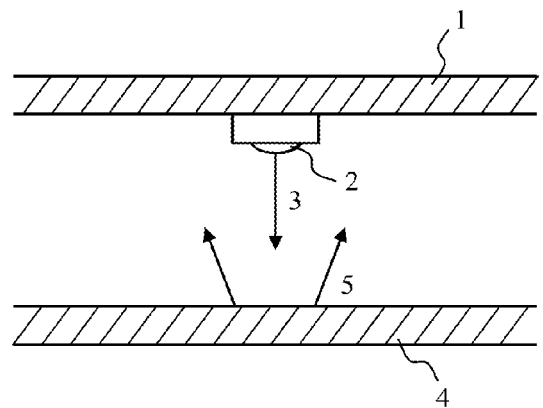
FIG. 3A is a sectional view of a lighting apparatus of the present invention in which a polymer-dispersed liquid-crystal panel is placed.

FIG. 3A shows an embodiment of the present invention in which microcapsulated liquid crystals dispersed in polymer are used for the panel. At zero volt to the liquid-crystal panel, the direction of the microcapsulated liquid crystals are at random, so that the light from LEDs (light-emitting diodes) is reflected on the liquid-crystal panel 4 and scattered as light 5, leading to indirect lighting. Liquid-crystal panels with such properties are so far used as optical blinds.

Figure 3B:
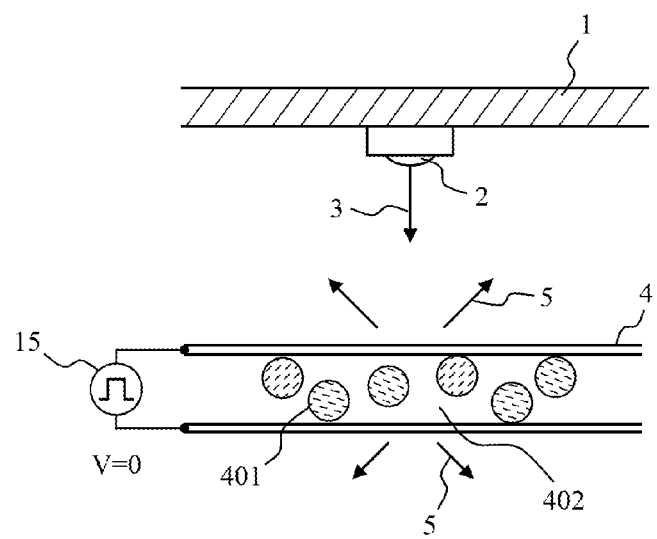
FIG. 3B shows a direction of liquid crystal molecules with zero voltage applied to a polymer-dispersed liquid-crystal panel of the present invention.
Figure 3C:
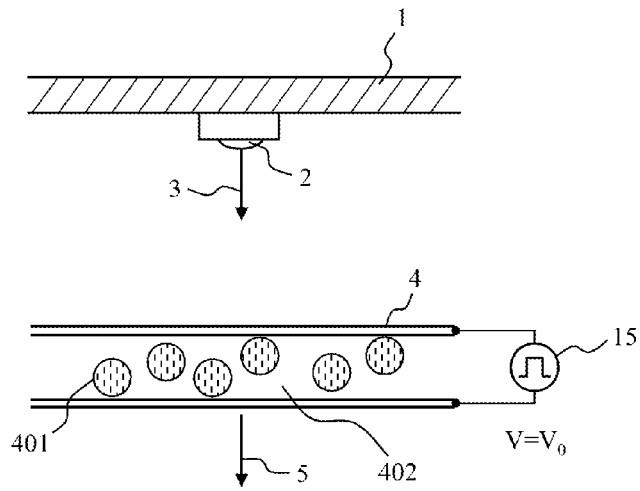
FIG. 3C shows a direction of liquid crystal molecules with a voltage applied to a polymer-dispersed liquid crystal panel of the present invention.

With reference to FIGS. 3B and 3C, the present invention is described. In a liquid-crystal panel of this present invention, the distance between the electrodes is 10 micron, and the size of a microcapsule 401 containing liquid crystals is about one microns; a plurality of the microcapsules are dispersed in polymer 402. As shown in FIG. 3B, at zero volt, a liquid-crystal panel of this present invention blocks light from LEDs, to be scattered and reflected for indirect lighting. As shown in FIG. 3C, at 5 volts, the liquid-crystal panel passes the light from LEDs through and the panel becomes transparent to give bright lighting.

In addition, a reflective liquid-crystal panel with polymer-dispersed liquid crystals used for mobile phone displays can be employed for this invention. At zero volts, it reflects and scatters light from LEDs, whereas it passes the light through at 5 volts to give brighter lighting.

Moreover, a liquid-crystal panel with polymer-dispersed liquid crystals, in which electrodes are of a plurality of concentric circles under LEDs can provide lens effects caused by light diffraction. Therefore, such a liquid-crystal panel concentrates or disperses further light from LED for regulating a wide range of lighting.

Figure 4:
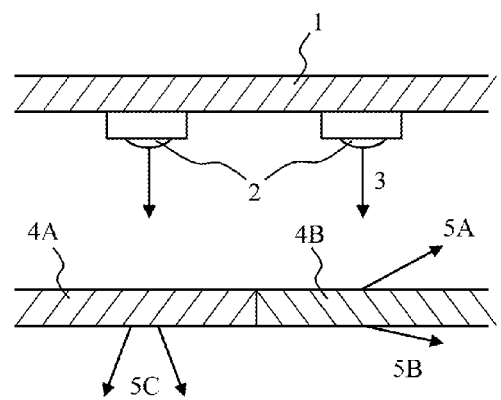
FIG. 4 is a sectional view of a lighting apparatus of the present invention placing liquid-crystal panel sections of different functions.

FIG. 4 illustrates an apparatus that provides complex illumination by giving different characteristics to a liquid-crystal panel with a plurality of sections, not a uniform liquid crystal panel. In FIG. 4, the right part of the liquid-crystal panel 4B, consisting of polymer-dispersed liquid crystals, scatters light 3 from LEDs (light-emitting diodes) as light 5A or 5B, whereas the left part of the liquid-crystal panel 4A, having a function of a concave lens, passes and disperses the light from LED (light-emitting diodes) 3 as 5C, making a left half of a room bright and a right half with indirect lighting.

Figure 5:
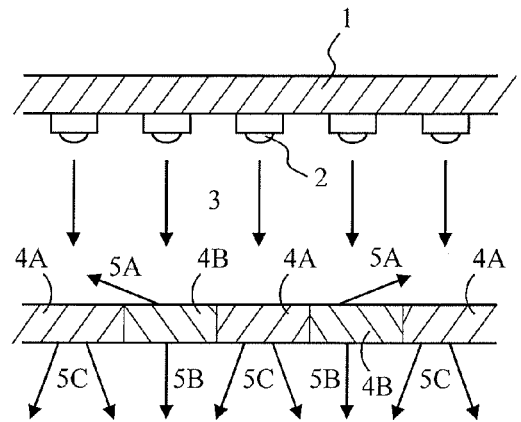
FIG. 5 is a sectional view of a lighting apparatus of the present invention placing liquid-crystal panel sections of different functions alternatively.

FIG. 5 is an embodiment of the present invention in which liquid-crystal panels of different functions are alternately positioned by sectioning. This is a lighting apparatus that provides mild illumination in a large area. By regulating voltages applied to sectioned liquid-crystal panels of different functions, lighting quality in a large area can be regulated. Also, a lighting apparatus in which the same functional liquid-crystal panels are divided into a plurality of sections, it can regulate lighting quality by regulating individual sections.

Figure 6:
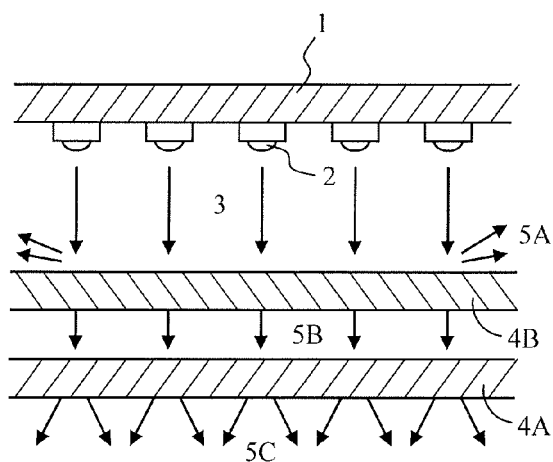
FIG. 6 is a sectional view of a lighting apparatus of the present invention placing liquid-crystal panels of different functions in layer.

FIG. 6 shows an embodiment of the present invention in which a plurality of liquid crystals of different functions are positioned in layers. The first liquid-crystal panel 4B is a polymer-dispersed liquid-crystal panel and the second liquid-crystal panel 4A is a liquid-crystal panel having a function of a concave lens. When a voltage is applied to the first liquid-crystal panel, it will be transparent to light, and an appropriately dispersed lighting can be provided by regulating a voltage to the second liquid-crystal panel. Also, reducing the voltage or applying zero volt to the first liquid-crystal panel, indirect lighting can be obtained.

Figure 7:
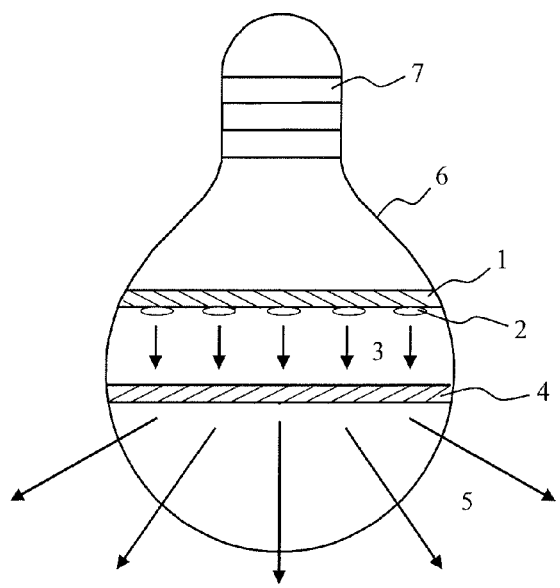
FIG. 7 is a sectional view of a bulb-shaped lighting apparatus of the present invention.

FIG. 7 shows an application of the present invention to a bulb-shaped LED lamp that is recently on market. A liquid-crystal panel 4 having a function of a concave lens is positioned away from the light-emitting substrate 1 of LEDs (light-emitting diodes) array 2 in the glass container 6. By regulating voltage to the liquid-crystal panel, spreading light 5 can be obtained.

Figure 8A:
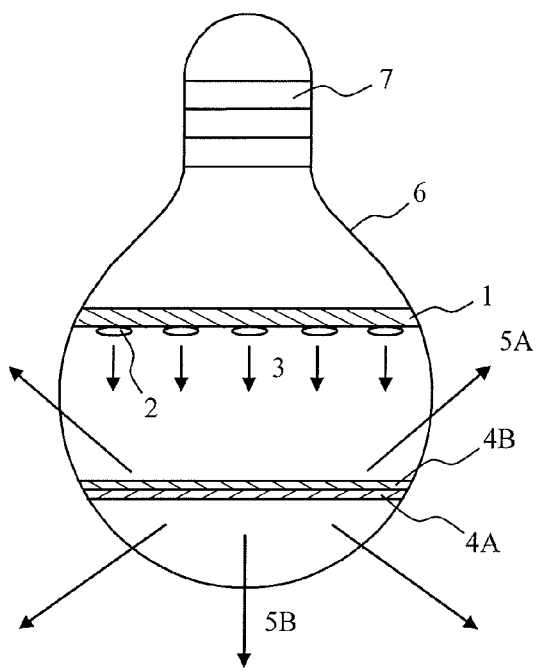
FIG. 8A is a sectional view of a bulb-shaped lighting apparatus placing liquid-crystal panels of different functions in layer.

FIG. 8A illustrates a similar bulb-shaped LED lamp of an embodiment of the present invention in which two liquid-crystal panels 4A and 4B of different characteristics are layered. The structure of FIG. 6 is applied to a bulb shaped LED lamp, thereby various types of lighting can be obtained. For a bulb-shaped lamp of FIG. 8B, two liquid-crystal panels 4A and 4A of different characteristics are layered. In this embodiment of the present invention, however, liquid panels 4A and 4B are curved in the same shapes of the bulb. That is, the liquid panels 4A and 4B have hemispheric shape.

Figure 9:
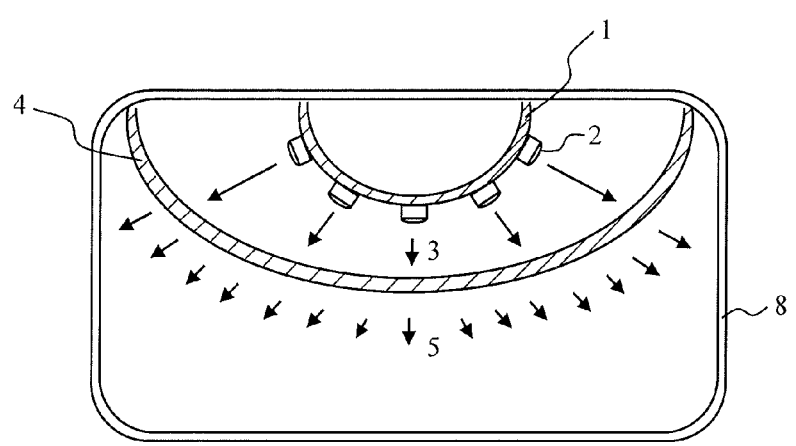
FIG. 9 shows a lighting apparatus for ceilings.

FIG. 9 shows a sectional view of a lighting apparatus of the present invention that is installed on a ceiling. Light of high directionality 3 from LEDs (light-emitting diode) 2 mounted on a hemicylinder substrate 1 inside a cover 8 is regulated to mild light 5 by a hemicylinder liquid-crystal panel 4 positioned in front of the LEDs 2. This hemicylinder liquid-crystal panel can be easily produced using a liquid-crystal film.

Figure 8B:
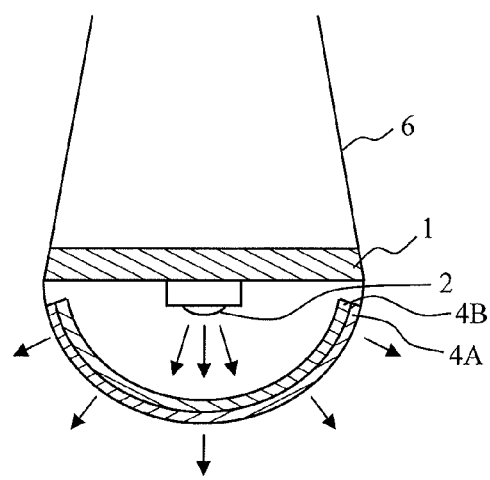
FIG. 8B is a sectional view of a bulb-shaped lighting apparatus of the present invention placing curved-surface liquid-crystal panels of different functions in layer.

In the examples of FIG. 9 and FIG. 8B, a curved liquid-crystal film panel is used. For such liquid-crystal panels, a plastic substrate may be used instead of a glass substrate.

Figure 10A:
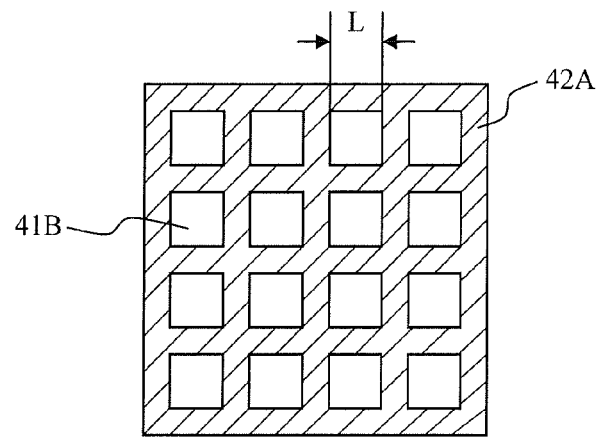
FIG. 10A is a plan view of a liquid-crystal panel used in the present invention.

FIG. 10A is a plan view of a liquid-crystal panel of the present invention that scatters light by forming a mesh electrode (consisting of electrode section 42A and non-electrode section 42B), not using a micro-lens described in the embodiment 1, to cause nonuniformity in an electric field distribution and to generate regular variation in the optical properties of the liquid-crystal.

Figure 10B:
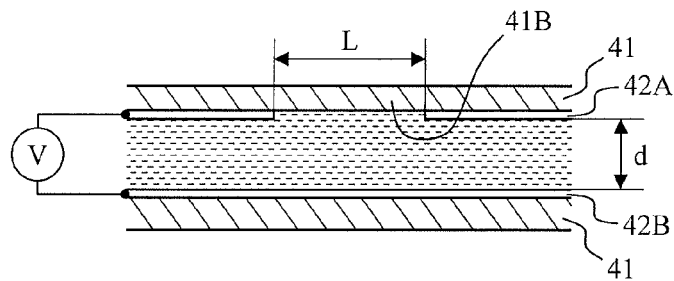
FIG. 10B is a sectional view of a liquid-crystal panel used in the present invention.

FIG. 10B is a sectional view of the liquid panel shown in FIG. 10A. The size of the non-electrode section 42 is L, and the distance between two electrodes 42A and 42B is d. In FIG. 10B, the non-electrode section 41B of size L is formed on the electrode 42A on the top side. On the other hand, the bottom side electrode 42B is evenly formed on the glass substrate 41. FIGS. 10C to 10F show examples for various ratios of L/d: size L of non-electrode section 41B to size d between two electrodes 42A and 42B.

Figure 10C:
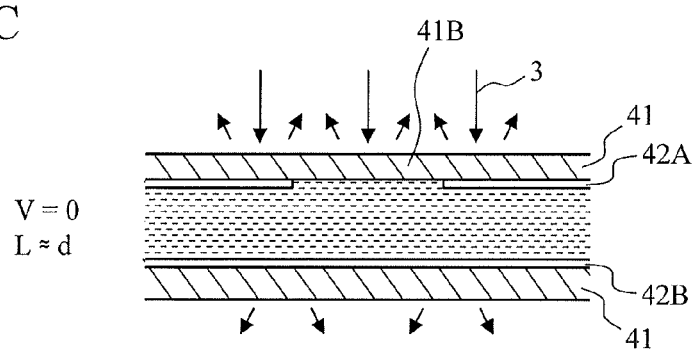
FIG. 10C is a sectional view of a liquid-crystal panel used in the present invention.
Figure 10D:
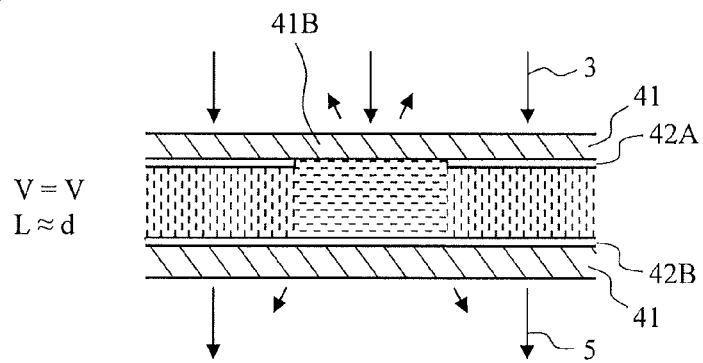
FIG. 10D is a sectional view of a liquid-crystal panel used in the present invention.

In the examples in FIG. 10C and FIG. 10D, size d between two electrodes 42A and 42B is comparatively larger and equivalent to size L. In FIG. 10C, voltage to be applied between two electrodes is V=0. In this case, light 3 from an LED (light emitting diodes) is mostly reflected and partially transmitted to be scattered, thereby a room becomes dark. In FIG. 10D, when voltage V=V is applied between the two electrodes, light 3 from an LED (light emitting diodes) is transmitted where electrodes are built, and it is mostly reflected and partially transmitted where the electrodes are not built, thereby the room is bright by indirect lighting due to the transmitted light and the reflected light.

Figure 10E:
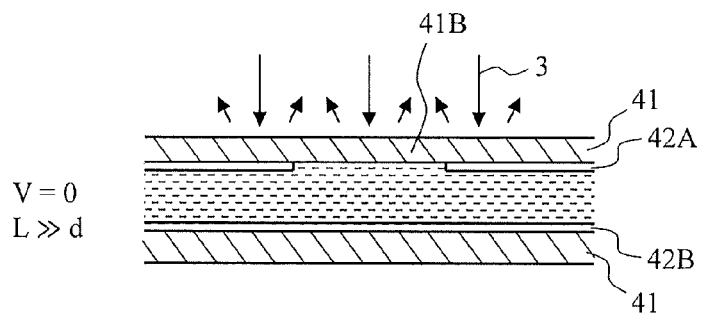
FIG. 10E is a sectional view of a liquid-crystal panel used in the present invention.
Figure 10F:
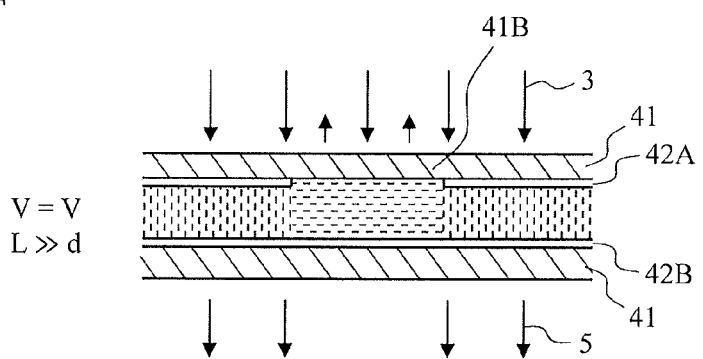
FIG. 10F is a sectional view of a liquid-crystal panel used in the present invention.

In the examples of FIG. 10E and FIG. 10F, the size d between two electrodes 42A and 42B is comparatively smaller and sufficiently smaller than the size L. In FIG. 10E, voltage between the two electrodes is V=0. In this case, most light from LEDs (light emitting diodes) reflects, thereby the room becomes dark. In FIG. 10F, voltage V=V is applied between the two electrodes. Light 3 from LEDs (light emitting diodes) is transmitted where electrodes are built, and is reflected where the electrodes are not built, thereby the room will becomes bright by indirect lighting due to the transmitted light and the reflected light.

Figure 10G:
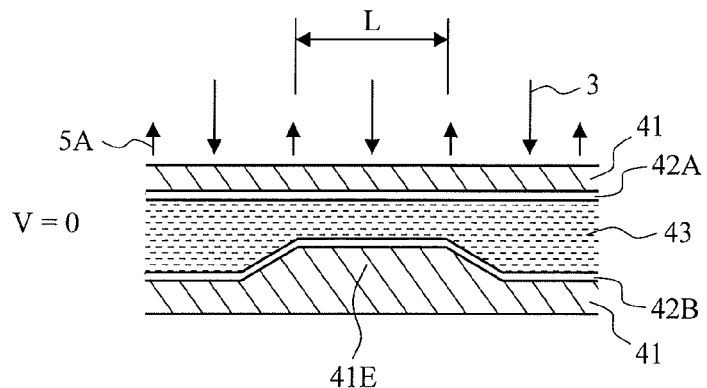
FIG. 10G is a sectional view of a liquid-crystal panel used in the present invention.
Figure 10H:
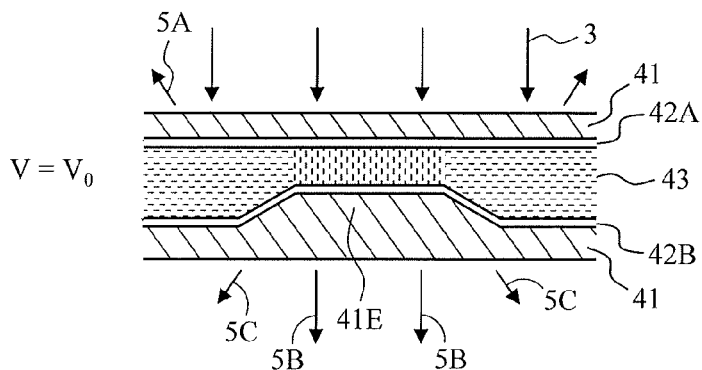
FIG. 10H is a sectional view of a liquid-crystal panel used in the present invention.
Figure 10I:
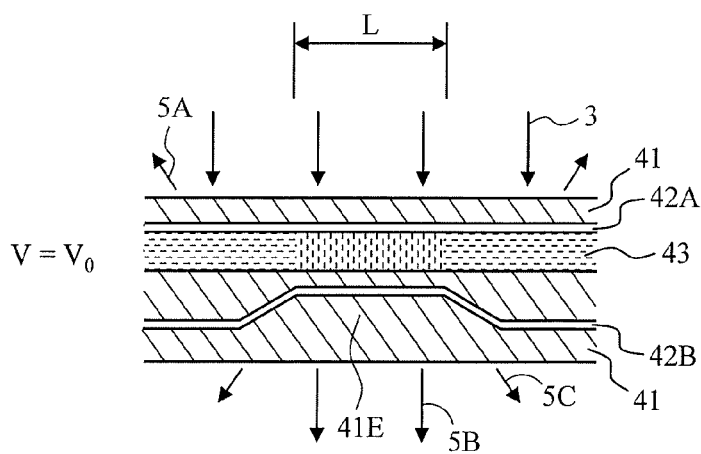
FIG. 10I is a sectional view of a liquid-crystal panel used in the present invention.

FIG. 10G to FIG. 10I show examples in which two electrodes 42A and 42B are completely formed and non-electrode section is not provided. In these examples the gap between the electrodes is narrow in a partial region of a single electrode of either 42A or 42B, and the gap size d between the electrodes is normal in other regions. Therefore, in these examples, a region of narrow gap between two electrodes is provided instead of a section of no electrode. The size of the region of narrow gap d between the two electrodes is L.

In the examples of FIG. 10G and FIG. 10H, each of two electrodes 42A and 42B is evenly provided on the internal surface of the glass substrate 41. However, one of the glass substrates 41 is partly thicker. In the area 41E where the thickness of the glass substrate 41 is greater, the thickness of liquid-crystal 43 and the gap between two electrodes are smaller.

In FIG. 10G, voltage to be applied between two electrodes is V=0. In this case, most light 3 from an LED (light emitting diode) reflects, thereby a room becomes dark. In FIG. 10H, voltage V=V$_0$ is applied between the two electrodes. Then, most light 3 from an LED (light emitting diode) is transmitted in the area where the gap between electrodes is narrow, thereby a room is bright by indirect lighting due to the transmitted light and the reflected light.

In the example of FIG. 10I, an electrode 42A of upper side is formed on the internal surface of the glass substrate 41 of the top side, whereas an electrode 42B is formed in the interior of a glass substrate 42 of the bottom side. The thickness of the two substrates and the thickness of the liquid-crystal 43 inserted between them are constant, but the gap between the two electrodes is not constant. In this case, when voltage V=0 is applied between the two electrodes, most light 3 from LED (light emitting diodes) is transmitted in the area where the gap between the electrodes is narrow, thereby a room becomes bright by indirect lighting due to the transmitted light and the reflected light.

In a liquid-crystal panel which has a function as a lens, as is already described, a lens with such a distinctive distance of focal points as is shown in prior art references is not needed. It may function as an indefinite light focus or diffusion. Therefore, as in an embodiment of the present invention, nonuniform structure of electrodes causes a nonuniform electric field. As a result, optical properties such as the refractive index of liquid-crystal materials become ununiform to cause light convergence or diffusion.

Figure 11:
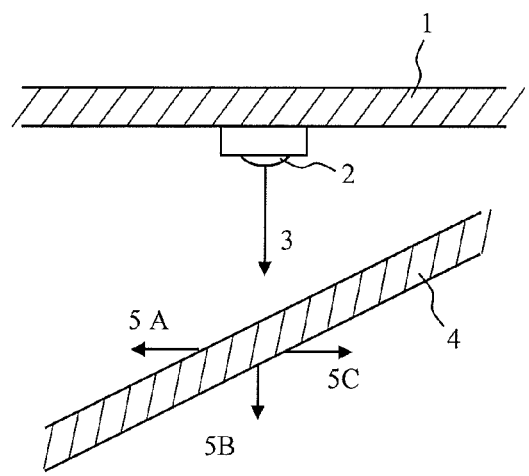
FIG. 11 is a sectional view of a lighting apparatus of the present invention placing a liquid-crystal panel slanted against a LED (light-emitting diode) substrate.

FIG. 11 is an embodiment of the present invention wherein a liquid-crystal panel is tilted against the LED (light-emitting diode) substrate. By tilting the liquid-crystal panel, light 3 from an LED (light-emitting diode) reflects on the surface of the liquid-crystal panel 4 as lights 5A. Also the transmitted light becomes lights as 5B and is scattered as lights 5C. Light 3 from an LED (light-emitting diode) spreads in an extremely large area to illuminate a space effectively.

Figure 12:
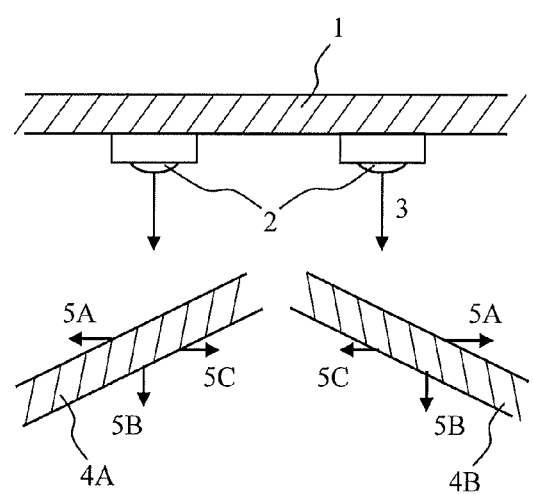
FIG. 12 is a sectional view of a lighting apparatus of the present invention placing two liquid-crystal panels slanted in opposite directions.

FIG. 12 is an embodiment of the present invention wherein each of the two liquid-crystal panels 4A and 4B are tilted in different directions, thereby wide-area illumination is possible by balancing the right and left spaces. Furthermore, with a plurality of such liquid-crystal panels, a great variety of lighting is made possible by controlling electric signals for individual liquid-crystal panels.

Figure 13A:
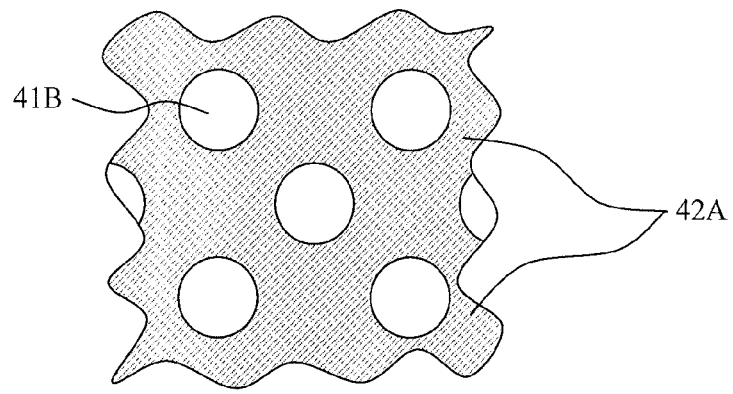
FIG. 13A is a plan view of an example of an electrode of a liquid-crystal panel used in the present invention.
Figure 13B:
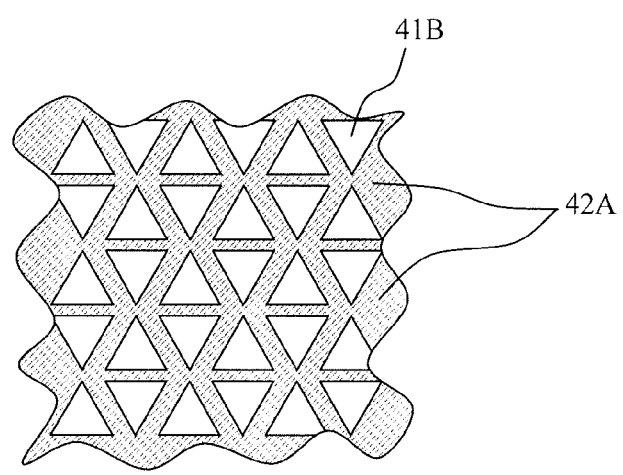
FIG. 13B is a plan view of an example of an electrode of a liquid-crystal panel used in the present invention.
Figure 13C:
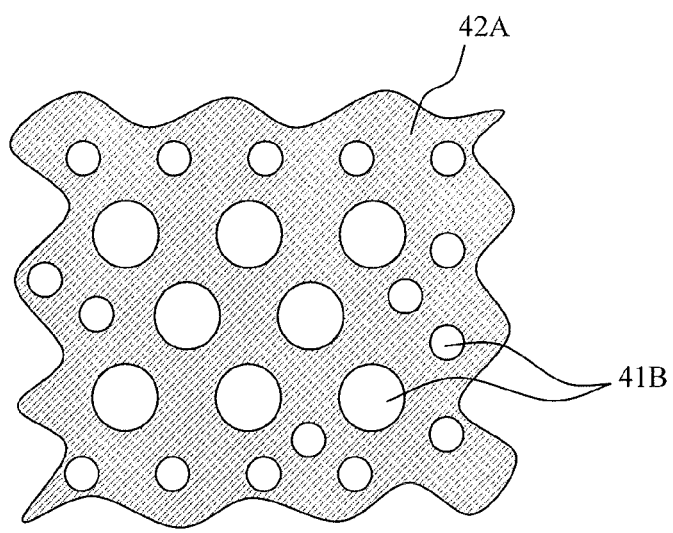
FIG. 13C is a plan view of an example of an electrode of a liquid-crystal panel used in the present invention.

FIG. 13A to FIG. 13C, show other forms of an embodiment shown in FIG. 10A, in which examples of the various forms of the electrode structure are shown. These electrode structures include an electrode section 42A and a non-electrode section 41B. The electrodes of this example can be obtained by first evenly forming transparent electrodes on a glass substrate and then eliminating them in sections with given forms. The non-electrode section 41B can have a form of a circle, a triangle, or others of various sizes. The pattern of the transparent electrodes can be produced by means of known lithography technologies. LEDs (light-emitting diodes) can be positioned as desired; for example, LEDs (light-emitting diode) can be positioned immediately above a circular non-electrode section 41B of relatively large size.

Figure 14A:
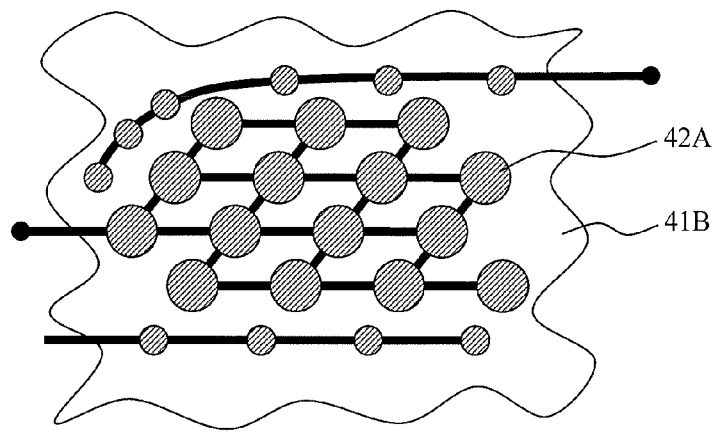
FIG. 14A is a plan view of an example of an electrode of a liquid-crystal panel used in the present invention.
Figure 14B:
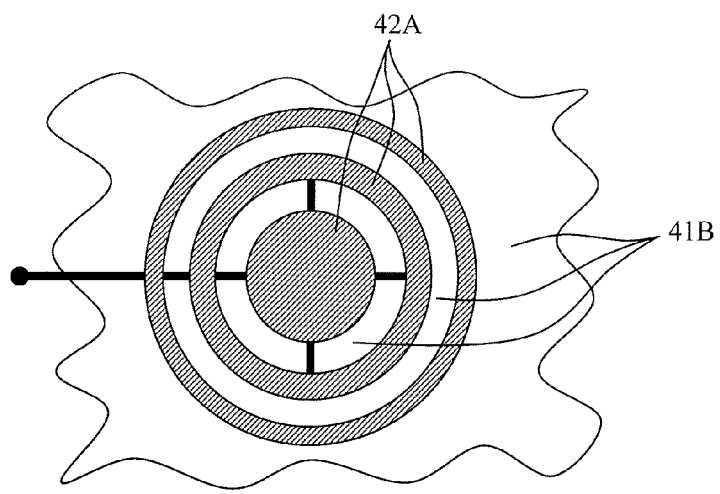
FIG. 14B is a plan view of an example of an electrode of a liquid-crystal panel used in the present invention.

FIG. 14A and FIG. 14B further show the examples of electrode structures in various forms. These electrode structures individually include a single electrode section 42A and a single non-electrode section 41B. The electrode of this example can be obtained by forming a transparent electrode in the area in given form on a glass substrate. The positioning LEDs (light-emitting diodes) directly above the area of relatively large electrode section 42A is favorable.

Figure 15A:
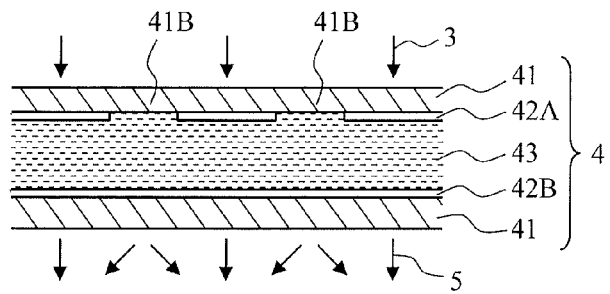
FIG. 15A is a sectional view showing an example of an electrode of a liquid-crystal panel of the present invention.
Figure 15B:
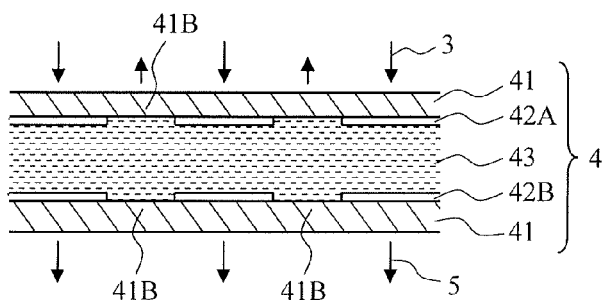
FIG. 15B is a sectional view showing an example of an electrode of a liquid-crystal panel of the present invention.
Figure 15C:
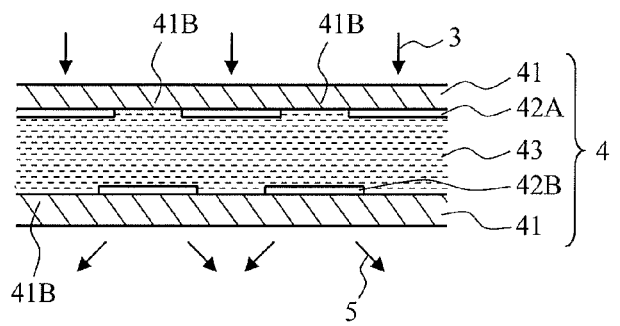
FIG. 15C is a sectional view showing an example of an electrode of a liquid-crystal panel used in the present invention.

With reference to FIG. 15A to FIG. 15C, the detail of electrode structures will be described. A liquid-crystal panel 4 is composed of two parallel glass substrates 41 provided with a single electrode 42A and a single electrode 42B made of a transparent conductive film such as ITO, wherein a liquid crystal material 43 is sealed.

In these examples, an electrode 42A on the top side and an electrode 42B on the bottom side are control electrode and common electrode respectively. The control electrode 42A on the top side includes a plurality of electrodes that are separated one another. That is, the common electrode 42A is separated by the non-electrode section 41B. Of a plurality of control electrodes 42A, a desired voltage is applied between a given electrode and the common electrode 42B on the bottom side.

In the example of FIG. 15A, a common electrode 42B is evenly formed in the internal surface of a glass substrate 41 on the bottom side. In the example of FIG. 15B, a common electrode 42B and a control electrode 42A have the same form and both are positioned on the corresponding places. In the example of FIG. 15C, a common electrode 42B and a control electrode 42A have the same form and both are positioned on different places each other. As described in these examples, the relative position of a common electrode 42B and a control electrode 42A can be freely set.

The electrodes that are shown in FIG. 13A to FIG. 13C and FIG. 14A to FIG. 14B are control electrodes, but a common electrode corresponding to the control electrodes can be arbitrarily positioned. Provided that control electrodes are arbitrarily positioned, the relative positional relation between a common electrode 42B and a control electrode 42A varies a direction of liquid crystal molecules, resulting in changing the light intensity and the characteristics of transmitted light.

Figure 16A:
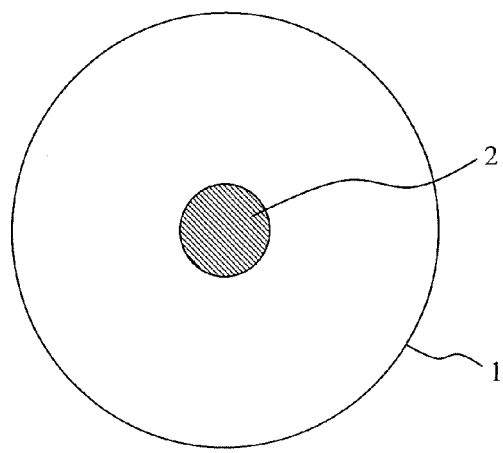
FIG. 16A is a plan view of an example of an LED used in the present invention.
Figure 16B:
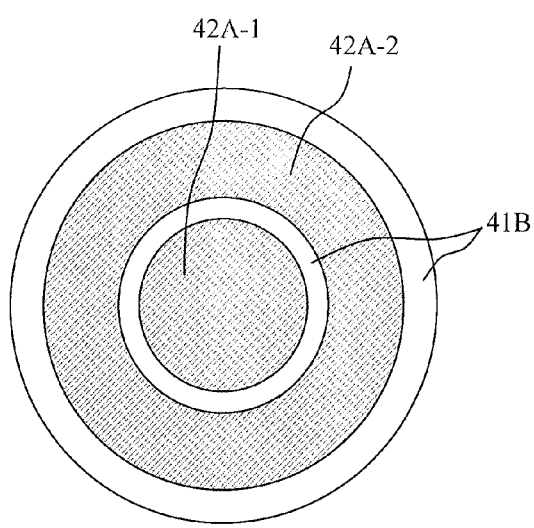
FIG. 16B is a plan view of an example of a liquid-crystal panel used in the present invention.

FIG. 16A shows the plan structure of LEDs (light-emitting diodes) 2 mounted on a substrate 1. FIG. 16B shows the form of a control electrode of a liquid-crystal panel that is positioned under these LEDs (light-emitting diodes) 2. The control electrodes 42A consists of an inside circular section 42A-1 and an outside ring section 42A-2. The circular section and the ring section, which are separated from each other via a non-electrode section 41B, are independently supplied with a voltage.

Figure 16C:
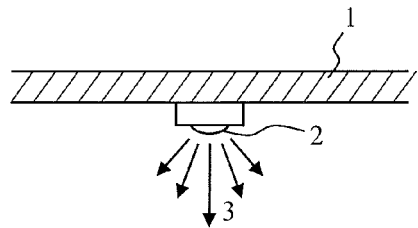
FIG. 16C is a sectional view showing an example of an electrode of a liquid-crystal panel of the present invention.
Figure 16D:
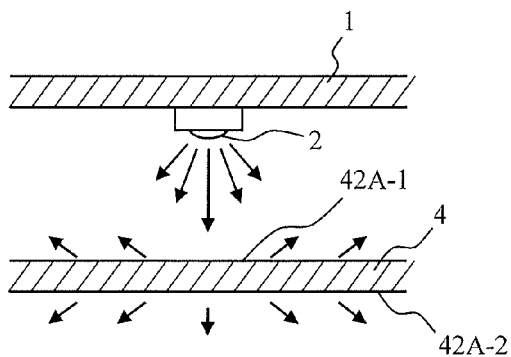
FIG. 16D is a sectional view showing an example of an electrode of a liquid-crystal panel of the present invention.
Figure 16E:
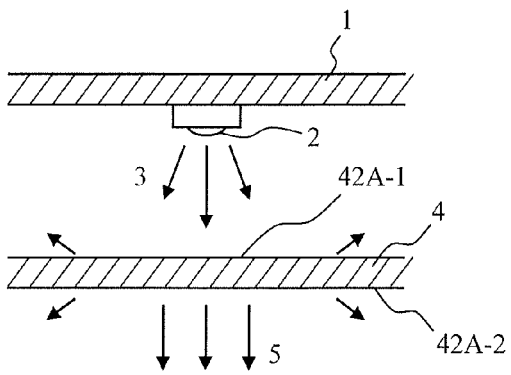
FIG. 16E is a sectional view showing an example of an electrode of a liquid-crystal panel of the present invention.
Figure 16F:
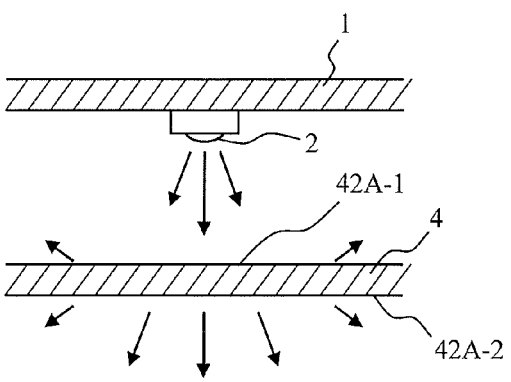
FIG. 16F is a sectional view showing an example of an electrode of a liquid-crystal panel used in the present invention.

With reference to FIG. 16C and FIG. 16F, the operation of the LED lighting apparatus shown in FIG. 16A and FIG. 16B is described. FIG. 16C shows the sectional structure of the LED (light-emitting diode) 2 mounted on the substrate 1. FIG. 16D to FIG. 16F show the sectional structures of the LED (light-emitting diode) 2 that is mounted on the substrate 1, and the liquid-crystal panel 4.

FIG. 16D shows the case of zero volt applied. Light from an LED (light-emitting diode) 2 is scattered by the liquid-crystal panel and it almost never passes through. FIG. 16E shows the case of voltage applied to both a circular section 42A-1 and a ring section 42A-2 of a control electrode, wherein light from an LED (light-emitting diode) 2 passes through the liquid-crystal panel. FIG. 16F shows the case when voltage is applied to a circular section 42A-1 and zero volt is applied to a ring section 42A-2. Light from an LED (light-emitting diode) 2 is passed through the circular section 42A-1 and is scattered in the ring section 42A-2.

Figure 17A:
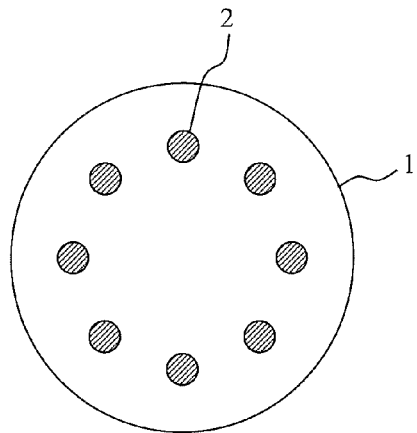
FIG. 17A is a plan view showing an example of a liquid-crystal panel of the present invention.
Figure 17B:
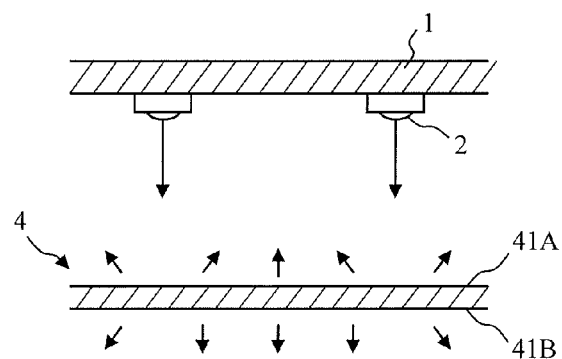
FIG. 17B is a sectional view showing an example of an electrode of a liquid-crystal panel used in the present invention.
Figure 17C:
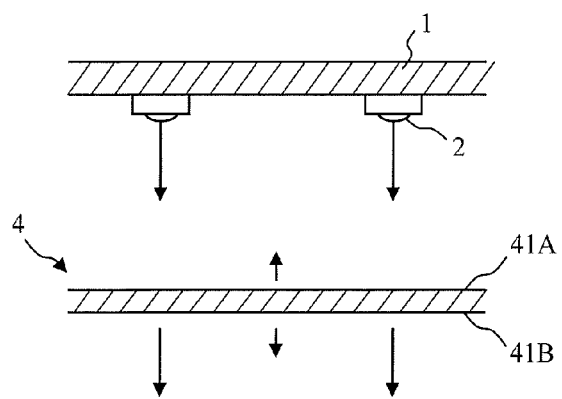
FIG. 17C is a sectional view showing an example of an electrode of a liquid-crystal panel of the present invention.

FIG. 17A shows LEDs (light-emitting diodes) 2 that are mounted on a substrate 1. The LEDs 2 are positioned in ring. FIG. 17B shows the case when zero volt is applied and light from LEDs is scattered on the liquid-crystal panel. FIG. 17C shows the case an applied voltage is not zero and light from LEDs is passed through the liquid-crystal panel.

Figure 18A:
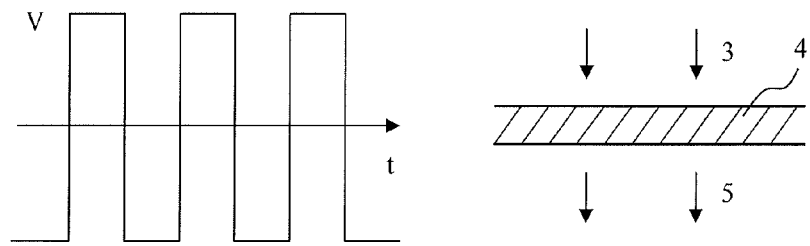
FIG. 18A shows an example of a voltage that is applied to the electrodes of a liquid-crystal panel of the present invention.
Figure 18B:
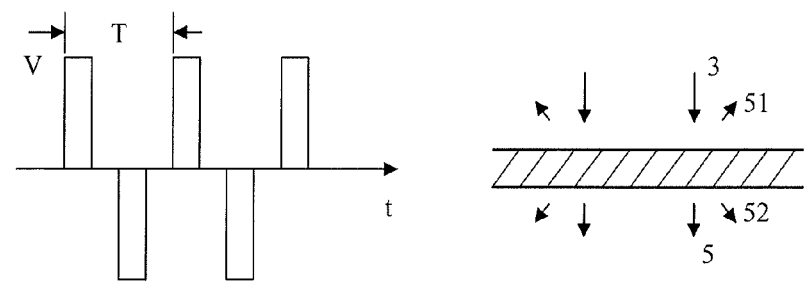
FIG. 18B shows an example of a voltage that is applied to the electrodes of a liquid-crystal panel of the present invention.
Figure 18C:
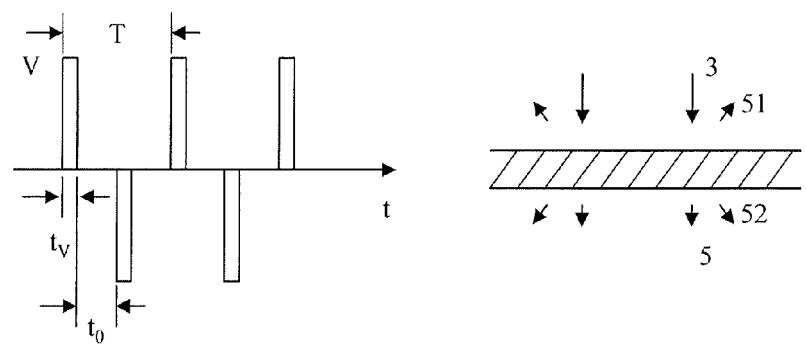
FIG. 18C shows an example of a voltage that is applied to the electrodes of a liquid-crystal panel of the present invention.

FIG. 18A shows voltages to be applied to a normal liquid-crystal panel. In a liquid-crystal panel to be used in a display device, positive and negative voltages are alternately applied. FIG. 18B and FIG. 18C show the examples of voltages that are applied to a liquid-crystal panel to be used in an LED lighting apparatus in accordance with the present invention. In this embodiment, a positive voltage is applied for time $t_v$, and then zero volt is applied for time $t_0$. Next a negative voltage is applied for time $t_v$ and zero voltage is applied for time $t_0$. These applications are repeated. A number of applications of positive voltages in one second is hereafter called "frequency". Frequency can be from several tens to several hundred cycles.

Figure 18D:
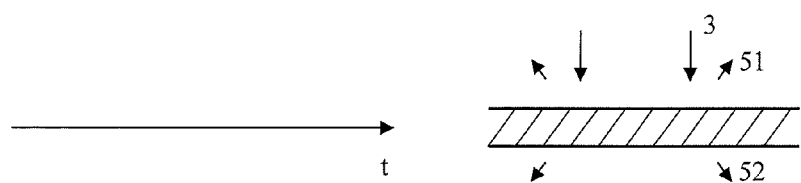
FIG. 18D shows an example of a voltage that is applied to the electrodes of a liquid-crystal panel of the present invention.

The ratio of time that either a positive or a negative voltage is applied to a single cycle T is called "duty". For example, the duty is 1 in FIG. 18A; 0.5 in FIG. 18B; and 0.2 in FIG. 18C. Setting certain values of duty and frequency enables a lighting apparatus to emit a desired amount of light. FIG. 18D shows when zero volt is applied. Light from LEDs is scattered by a liquid-crystal panel.

Figure 19A:
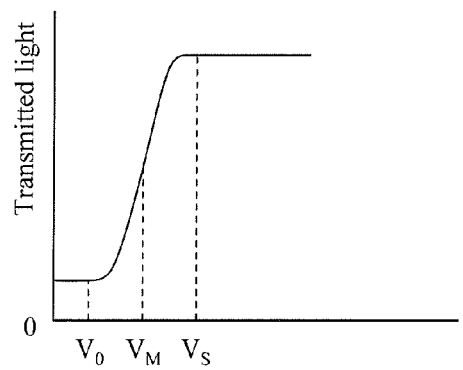
FIG. 19A explains an example of a voltage that is applied to the electrodes of a liquid-crystal panel of the present invention.

FIG. 19A shows a relationship between a voltage to be applied to a liquid-crystal panel and the amount of light transmitted. When the voltage is $V_0$, the light transmitted is very small, whereas when the voltage is increased to $V_M$, the light transmitted increases. When the voltage is greater than $V_S$ the light transmitted becomes maximum.

Figure 19B:
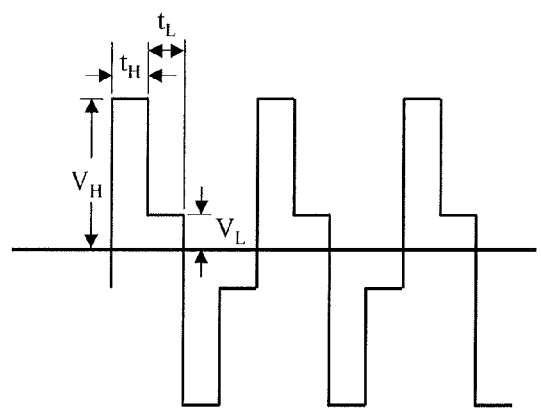
FIG. 19B explains an example of a voltage that is applied to the electrodes of a liquid-crystal panel of the present invention.

FIG. 19B shows an example of voltage applied to a liquid-crystal panel of the lighting apparatus of the present invention. In this embodiment, a positive voltage $V_H$ is applied for time $t_H$ and a positive voltage $V_L$ for time $t_L$. Next a negative voltage $V_H$ is applied for time $t_H$ and a negative voltage $V_L$ is applied for time $t_L$. These applications are repeated. One cycle is given by time $(t_H+t_L)\times 2$. $V_H$ and $V_L$ can be of any values. High voltage $V_H$ can be $V_S$ in FIG. 19A and low voltage $V_L$ can be $V_0$ or $V_M$ in FIG. 19A. Thus, this case, most of the light from LEDs (light-emitting diodes) 2 is passed through for a time $t_H$ and the light from LEDs (light-emitting diodes) is partly passed through and the most of the light is scattered for time $t_L$. The explanation is made on a case that the transparency of liquid-crystal panel is changed with the change of applied voltage. In general, controlling an applied voltage varies the optical characteristics of liquid crystal. Herein the optical characteristics include light transmission rate, light refraction rate, and light attenuation rate. In the present invention, controlling an applied voltage varies the optical characteristics of liquid crystal in a desired mode, thereby illumination light from an LED lighting apparatus can be varied in a desired mode.

The explanation is made with reference to FIG. 19A and FIG. 20A to FIG. 20E. FIG. 6 shows an example of two layered liquid-crystal panels. In these embodiments, the liquid-crystal panel has a similar structure to the layered two panels. The liquid-crystal panel of the present embodiment also has three parallel glass substrates 411, 412, and 413. On the interior surface of the glass substrate 411 on the top, a first control electrode 421 is formed; on the both sides of the glass substrate 412 in the middle, common electrodes 422 and 423 are formed; and on the interior surface of the glass substrate 413 on the bottom, a second control electrode is formed. Between these three parallel glass substrates, liquid crystals 431 and 432 are individually sealed.

The first liquid-crystal panel is composed of the first control electrode 421 and the common electrode 422, and the second liquid-crystal panel is composed of the second control electrode 424 and the common electrode 423. Voltage to the first liquid-crystal panel is $V_1$, and voltage to the second liquid-crystal panel is $V_2$.

Figure 20A:
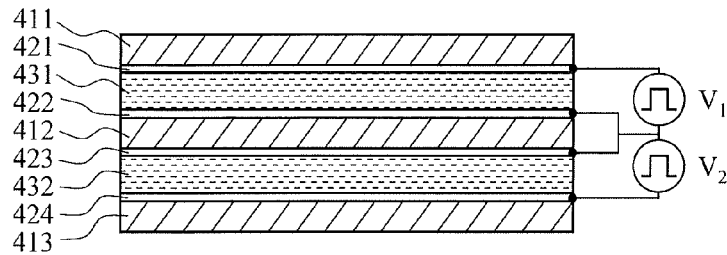
FIG. 20A is a sectional view of a lighting apparatus of the present invention placing liquid-crystal panels of different functions in layer.
Figure 20B:
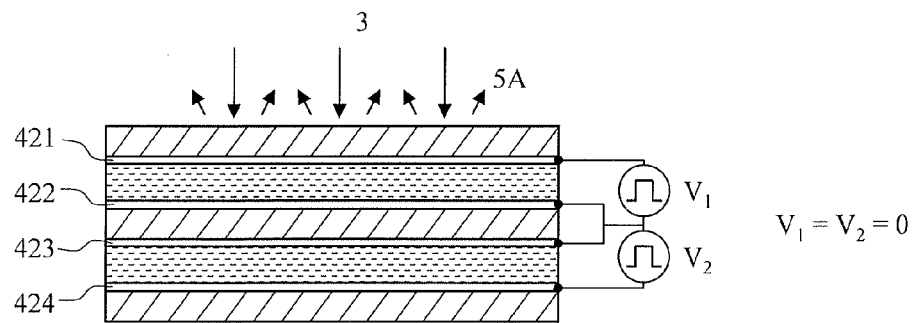
FIG. 20B is a sectional view of a lighting apparatus of the present invention placing liquid-crystal panels of different functions in layer.
Figure 20C:
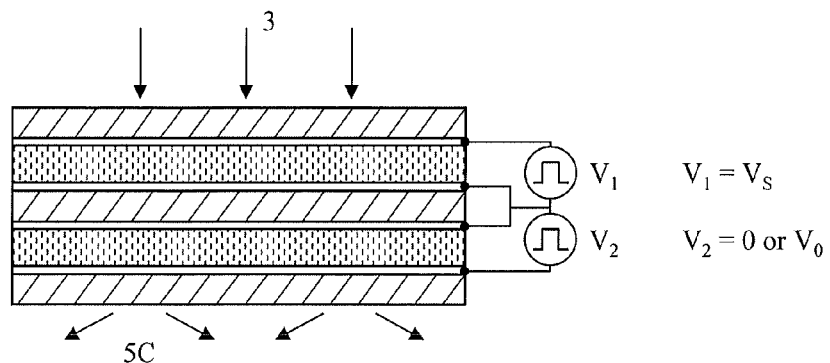
FIG. 20C is a sectional view of a lighting apparatus of the present invention placing liquid-crystal panels of different functions in layer.

FIG. 20B shows the case when both applied voltages to two liquid-crystal panels are zero, where $V_1=V_2=0$. In this case, most of the light 3 from the LEDs (light-emitting diodes) 2 is reflected and is scattered. FIG. 20C shows the case that voltage $V_1$ applied to the first liquid-crystal panel is $V_1=V_S$ and voltage applied to the second liquid-crystal panel is either $V_2=0$ or $V_0$. In this case, most of the light 3 from the LEDs (light-emitting diodes) 2 is passed through the first liquid-crystal panel and most of the passed light is reflect on the second liquid-crystal panel and is scattered.

Figure 20D:
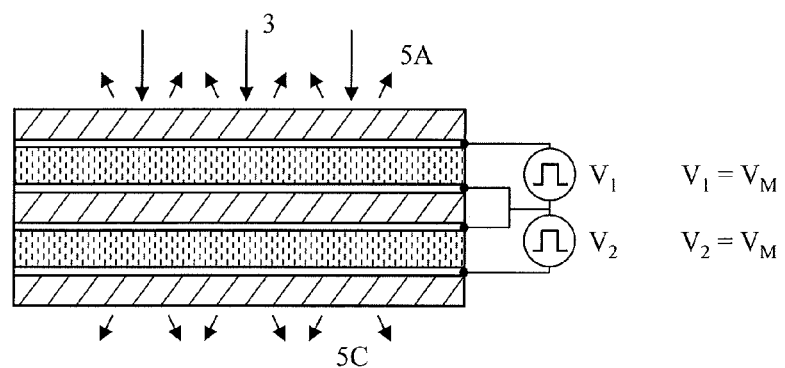
FIG. 20D is a sectional view of a lighting apparatus of the present invention placing liquid-crystal panels of different functions in layer.

FIG. 20D show the case when $V_M$ volts are applied to two liquid crystal panels individually. That is, $V_1=V_2=V_M$. In this case, about half of the light 3 from the LEDs (light-emitting diodes) 2 passes through the first liquid-crystal panel, and half of the light that have passed through passes through the second liquid-crystal panel. Thus, changing each of the voltages applied to the two liquid-crystal panels can provide desired illuminating light.

Figure 20E:
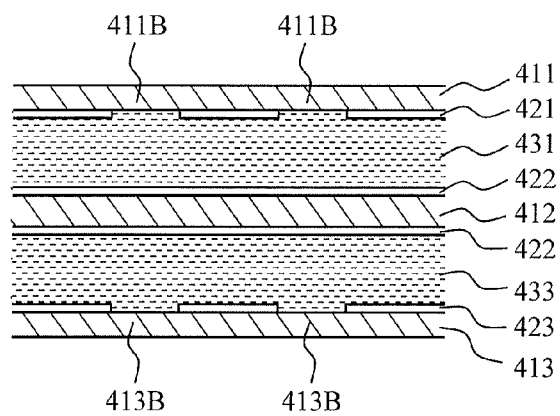
FIG. 20E is a sectional view of a lighting apparatus of the present invention placing liquid-crystal panels of different functions in layer.

FIG. 20E further shows a different example of a layered liquid-crystal panel of the present invention. In the liquid-crystal panel of this example, the control electrodes shown in FIG. 15A to FIG. 15C are used. Compared with the example shown in FIG. 20A, the first control electrode 421 and the second control electrode 422 are of separate type. The control electrodes 421 and 423 are separated into a plurality of electrodes by non-electrode sections 411B and 413B respectively; thereby a voltage can be independently applied to each of the electrodes.

Figure 21A:
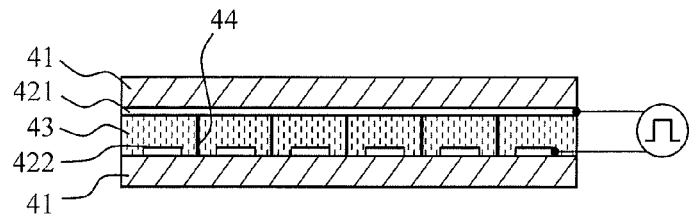
FIG. 21A is a sectional view of an example of a liquid-crystal panel of the present invention.
Figure 21B:
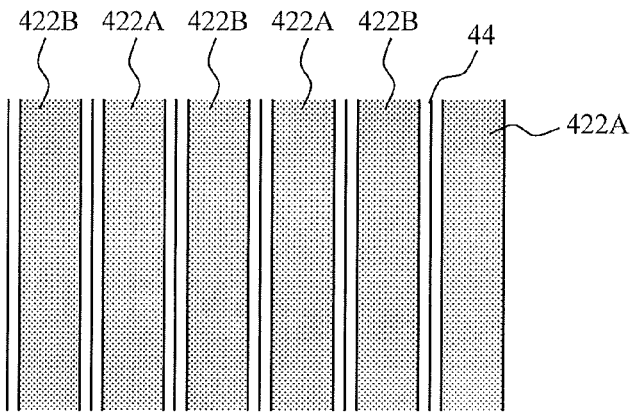
FIG. 21B is a sectional view of an example of a liquid-crystal panel of the present invention.
Figure 21C:
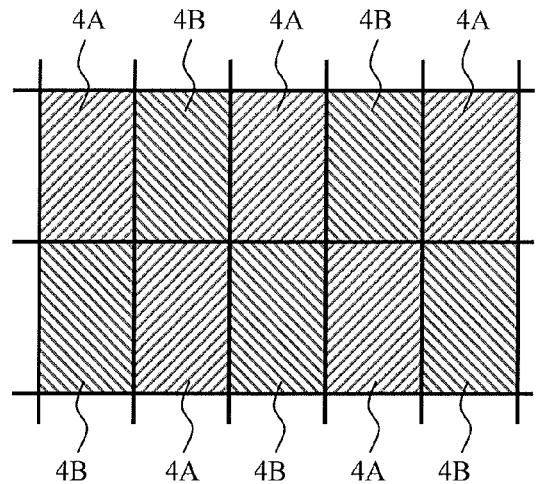
FIG. 21C is a sectional view of an example of a liquid-crystal panel of the present invention.

FIG. 21A shows the sectional structure of a different example of a liquid-crystal panel. The liquid crystal panel of this example comprises two glass substrates 41 and liquid crystals 43 that are sealed between the two glass substrates. Space between the glass substrates 41 is divided into a plurality of areas by separators 44. In each area different liquid crystal 43 is sealed. Either the common electrode 421 or the control electrodes 422 is provided on the internal surface of the glass substrates 41. One of the control electrodes is provided for each area. FIG. 21B shows a plan structure of the control electrodes of this example. A desired voltage is applied between a given one of the plurality of electrodes and the common electrode 421. In the liquid crystal panels shown in FIG. 15A to FIG. 15C, only a single type of liquid crystal panel can be used. However, in the liquid-crystal panel of this example, different types of liquid crystal can be used. FIG. 21C shows a plan structure of the liquid-crystal panel of this example. The liquid-crystal panel of this example has functions equivalent to those of the plane combination of different panels. In the example of FIG. 21B, the liquid-crystal panel has functions equivalent to those of different liquid-crystal panels array in stripe. In the example of FIG. 21C the liquid-crystal panel has functions equivalent to those of different liquid-crystal panel array in tile.

Figure 21D:
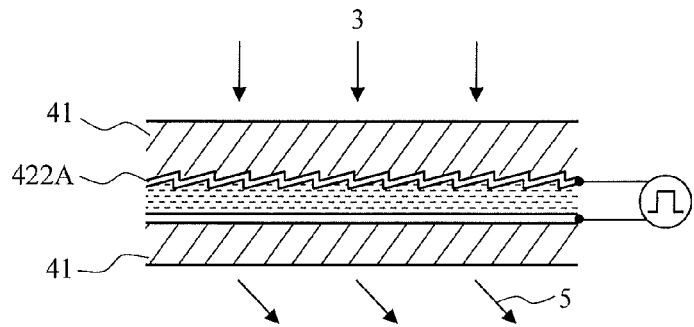
FIG. 21D is a sectional view of an example of a liquid-crystal panel of the present invention.
Figure 21E:
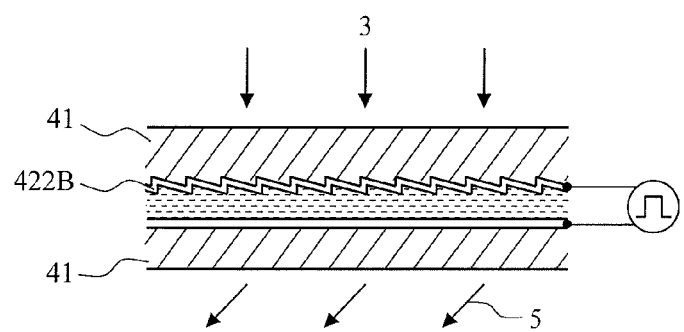
FIG. 21E is a sectional view an example of a liquid-crystal panel of the present invention.
Figure 21F:
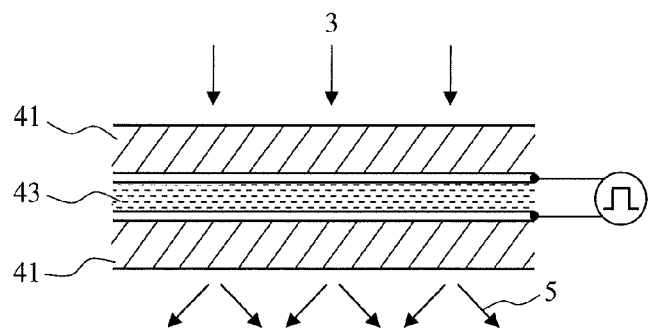
FIG. 21F is a sectional view of an example of a liquid-crystal panel of the present invention.

FIG. 21D to FIG. 21F are other examples of a liquid-crystal panel unit to be embedded in the liquid-crystal panel shown in FIG. 21B or FIG. 21C. In these examples, liquid-crystal panels with different structures of the control electrodes are combined. In the examples of FIG. 21D and FIG. 21E the control electrodes on the top have the Fresnel structure, whereas in the example of FIG. 21F a normal plain electrode is used. In the examples of FIG. 21D and FIG. 21E, the direction of the Fresnel lenses are different from each other. Embedding these liquid-crystal panels, individual liquid-crystal panels 4A and 4B in FIG. 21C can provides desired illuminating light.

Figure 22A:
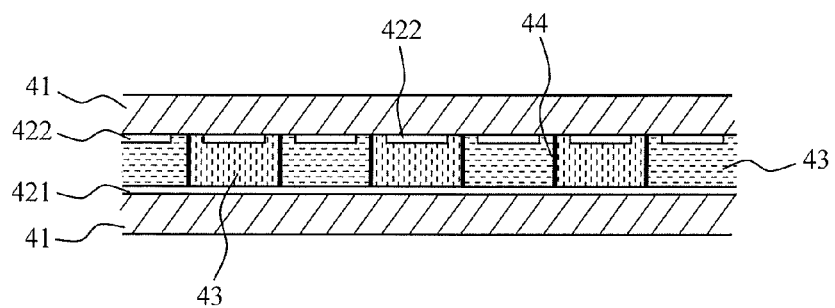
FIG. 22A is a sectional view of an example of a liquid-crystal panel of the present invention.
Figure 22B:
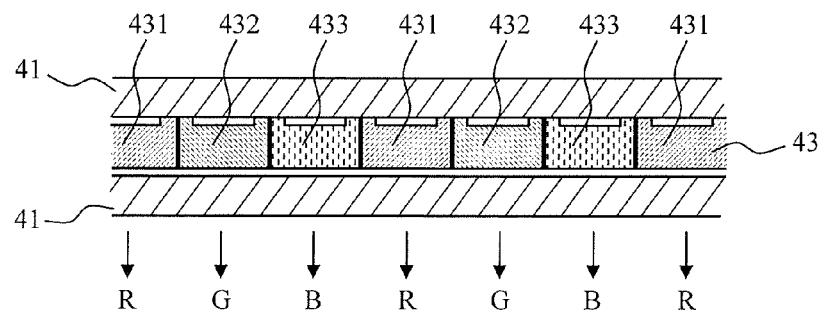
FIG. 22B is a sectional view of an example of a liquid-crystal panel of the present invention.
Figure 22C:
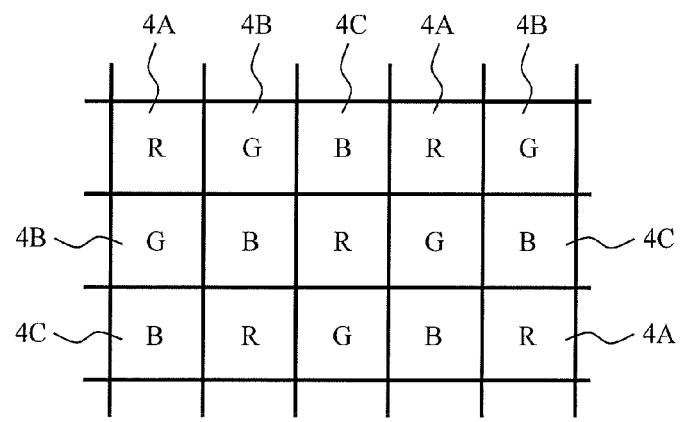
FIG. 22C is a sectional view of an example of a liquid-crystal panel of the present invention.

With reference to FIG. 22A to FIG. 22C, further different examples of the liquid crystal-panel of the present invention are described. FIG. 22A shows a sectional structure of the liquid-crystal of this example. The liquid crystal panel of this example can be similar to the panel of FIG. 21A. In this example, the guest-host liquid crystal 43 is used. Pigments which have different absorption colours are added to the guest-hot liquid crystal 43. That is, in this example the guest-host liquid crystal 43 to which different pigments are added is used instead of different types of liquid crystal. In FIG. 22B liquid crystals that provide light of one of three pigment colors: red, green, and blue are combined. The first liquid crystal 431 provides red light, the second liquid crystal 432 green light, and the third liquid crystal 433 blue light. FIG. 22C, thus, shows a plan structure of the liquid-crystal panels that provides light of one of the three pigment colours: red, green, and blue.

Figure 23:
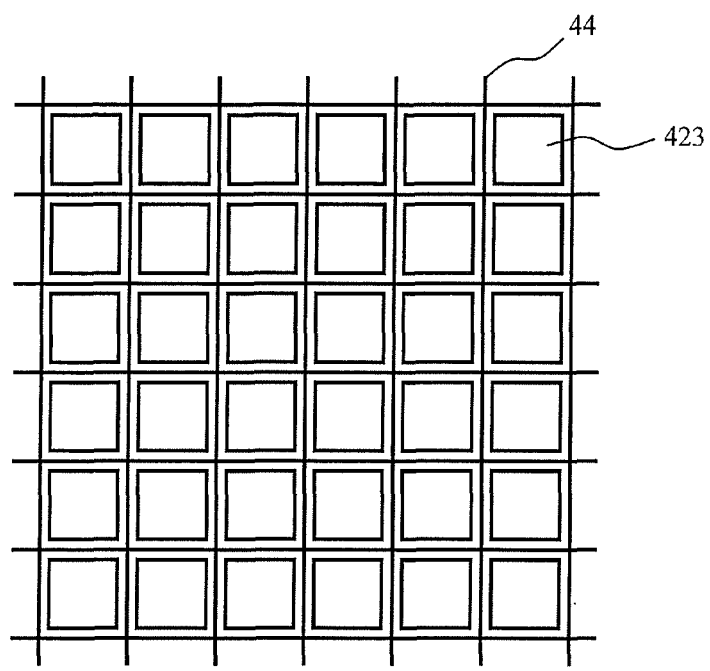
FIG. 23 is a sectional view of an example of a liquid-crystal panel of the present invention.

FIG. 23 shows an example of a lattice-shaped liquid-crystal panel. In the liquid-crystal panel in accordance with an embodiment of the present invention, a plurality of either square liquid-crystal panels or rectangular liquid-crystal panels are arrayed. As shown in FIG. 23, the space between the two substrates is divided into a plurality of regions by a separator 44. Control electrode 423 is placed on each region. A plurality of square liquid-crystal panels or rectangular liquid-crystal panels are formed herewith. The size of a single liquid-crystal panel consisting of the liquid-crystal panel in the present invention can be very small, for example, it can be less than 1 cm such as several millimeters.

Figure 24:
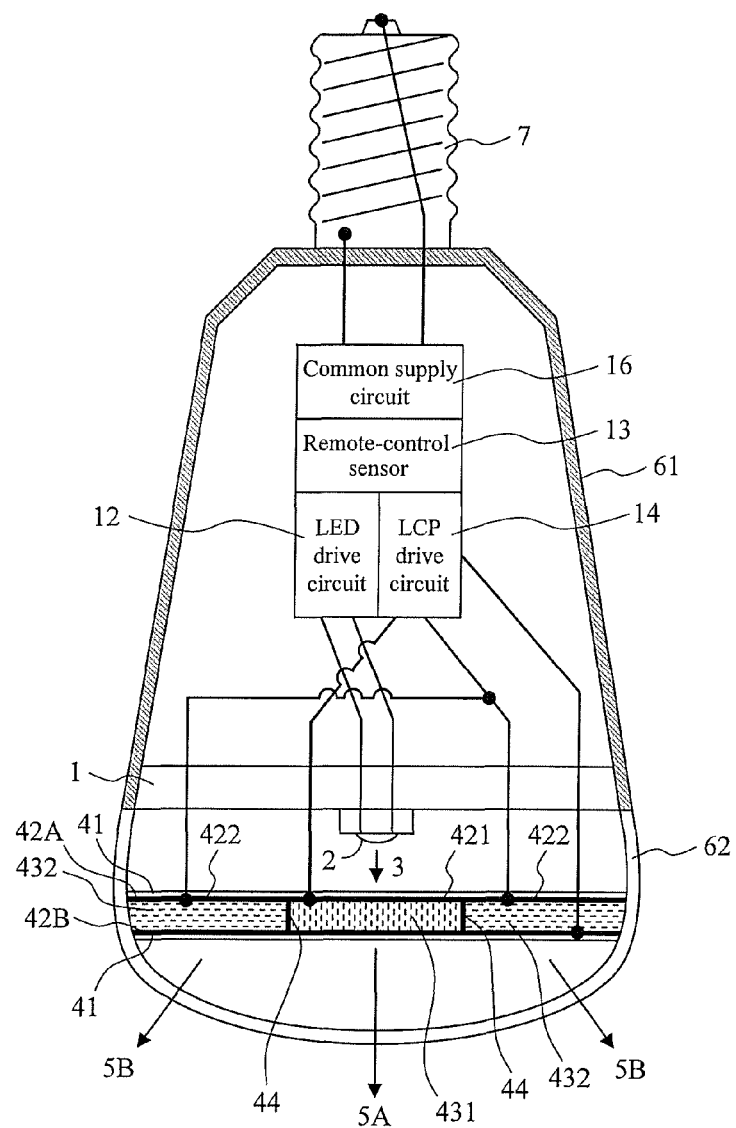
FIG. 24 is a sectional view of a bulb-shaped lighting apparatus of the present invention.

FIG. 24 shows that either of the liquid-crystal panels shown in FIG. 21A or in FIG. 22A is applied to the bulb-type LED lamp of FIG. 7. Desired voltages can be independently applied to each panel.

Several embodiments of the present invention are described above; however, the present invention is not limited to them. Therefore, those skilled in the art can easily understand that the present invention can be applied widely within the scope of the invention claims.

INDUSTRIAL APPLICABILITY

An LED lighting apparatus of the present invention is industrially easy-producible and in wide demand including home and offices, so its industrial value is very high. In particular, liquid-crystal panels for displays require highly sophisticated technologies such as alignment for polarizing plates and liquid crystal substrates. A liquid-crystal panel of the present invention, however, does not necessarily require such polarizing plates or alignment, and its manufacturing is extremely easy. Therefore, the LED lighting apparatus can be produced at low cost for higher potential popularization.

LIST OF REFERENCE SYMBOLS

1: LED (light-emitting diode) substrate, 2: LED (light-emitting diode), 3: light from LED (light-emitting diode), 4, 4A, and 4B: liquid-crystal panel, 5, 5A, 5B, 5C: light from liquid-crystal panel, 6: glass container of a light bulb, 7: base of a light bulb, 8: cover, 13: remote-control sensor (remote-control signal receiver), 14: liquid-crystal drive circuit, 12: LED drive circuit, 15: commercial power supply, 41: glass substrate, 42: transparent electrode, 43: liquid crystal, 41A: convex lens section, 41B: hole, 41C: concave lens section, 41D: Fresnel lens section, 400: liquid crystal molecule, 401: microcapsule

The invention claimed is:

1. An LED light bulb apparatus comprising:
   a bulb container;
   a bulb base closing an end of the bulb container;
   an LED in the bulb container;
   an LED drive circuit that drives the LED;
   a liquid-crystal panel that is placed in the bulb container with air space in front of the LED so as to face the LED, and transmits light from the LED and emits the light as spatial illumination light, the liquid-crystal panel comprising liquid-crystal molecules that change a light transmittance depending on their direction of orientation, the liquid-crystal molecules being sealed between two parallel transparent substrates respectively having first and second transparent electrodes; and
   a liquid-crystal drive circuit that controls a voltage to be applied between the first and the second transparent electrodes,
   wherein the voltage has a periodical waveform, and
   the liquid-crystal drive circuit controls the spatial illumination light by changing the light transmittance of the liquid-crystal panel by adjusting the periodical waveform, whereby the orientation of the liquid-crystal molecules is controlled.

2. The LED light bulb apparatus according to claim 1, wherein:
   the periodical waveform includes a voltage section where a light transmittance of the liquid-crystal panel increases, and a voltage section where the light transmittance of the liquid-crystal panel decreases.

3. The LED light bulb apparatus according to claim 1, wherein
   the liquid-crystal panel comprises a plurality of liquid-crystal panel sections.

4. The LED light bulb apparatus according to claim 1, wherein:
   voltages to be applied to the liquid-crystal panel section are independently controlled from each other by the liquid-crystal drive circuit.

5. The LED light bulb apparatus according to claim 3, wherein
   the liquid-crystal panel comprises the plurality of liquid-crystal panel sections in layer.

6. The LED light bulb apparatus according to claim 3, wherein
   the liquid-crystal panel comprises the plurality of liquid-crystal panel sections that are aligned along a plane.

7. The LED light bulb apparatus according to claim 6, wherein
   the plurality of liquid-crystal panel sections are separated by a separator provided between the two parallel transparent substrates.

8. The LED light bulb apparatus according to claim 3, wherein
   a micro lens or a Fresnel lens is formed on at least one of the two parallel transparent substrates of the plurality of liquid-crystal panel sections.

9. The LED light bulb apparatus according to claim 3, wherein;
   the liquid-crystal panel comprises guest-host liquid crystals; and
   pigments that produce different colors of light from one another are added to each of the plurality of liquid-crystal panel sections.

10. The LED light bulb apparatus according to claim 1, wherein the first electrode comprises a plurality of electrode sections that are separated from one another.

11. The LED light bulb apparatus according to claim 1, wherein
the liquid-crystal panel comprises a liquid-crystal film panel.

12. The LED light bulb apparatus according to claim 1, wherein the liquid-crystal panel has polymer-dispersed liquid crystals.

13. The LED light bulb apparatus according to claim 1, wherein the liquid-crystal drive circuit has a remote-control sensor.

14. The LED light bulb apparatus according to claim 1, wherein the liquid-crystal drive circuit has a human detection sensor.

15. The LED light bulb apparatus according to claim 1, wherein the first and the second transparent electrodes are formed evenly on entire surfaces of the two transparent substrates.

16. The LED light bulb apparatus according to claim 1, wherein at least one of the two transparent substrates has a non-electrode section formed on a surface of the one of the two transparent substrates.

17. The LED light bulb apparatus according to claim 1, wherein the liquid-crystal drive circuit adjusts a value, a polarity and an application time of a voltage in the periodical waveform.

18. The LED light bulb apparatus according to claim 1, wherein the control of voltage by the liquid-crystal drive circuit changes the orientation of the liquid crystal molecules to permit concentration or dispersion of the light from the LED.

19. The LED light bulb apparatus according to claim 1, wherein the liquid-crystal drive circuit controls the orientation of the liquid-crystal molecules to vary at least one optical characteristic selected from transmission rate, refraction rate and attenuation rate of the light transmitted by the liquid-crystal panel.

20. The LED light bulb apparatus according to claim 1, wherein each of the first and second transparent substrates is provided with a single transparent electrode.

* * * * *